United States Patent [19]
Endo et al.

[11] Patent Number: 5,587,978
[45] Date of Patent: Dec. 24, 1996

[54] RECORD/REPRODUCTION APPARATUS FOR RECORDING/REPRODUCING MULTI-CHANNEL SIGNALS IN DIFFERENT AREAS OF A RECORDING MEDIUM

[75] Inventors: Kazuhito Endo; Masayuki Ishida; Yoshinobu Ishida; Manabu Tsukamoto; Nobuaki Hirai, all of Nagaokakyo, Japan

[73] Assignee: Mitsubishi Denki Kabushiki Kaisha, Tokyo, Japan

[21] Appl. No.: 46,143

[22] Filed: Apr. 15, 1993

[30] Foreign Application Priority Data

Apr. 16, 1992 [JP] Japan .................................. 4-096216
Apr. 17, 1992 [JP] Japan .................................. 4-097629
May 6, 1992 [JP] Japan .................................. 4-113596

[51] Int. Cl.$^6$ ............................................ G11B 17/22
[52] U.S. Cl. ...................... 369/32; 369/48; 369/49; 369/60
[58] Field of Search ............................ 369/47, 54, 58, 369/32, 60, 52, 48, 49, 59, 30, 33; 360/18, 19.1, 20, 22, 23, 24

[56] References Cited

U.S. PATENT DOCUMENTS

| | | | |
|---|---|---|---|
| 4,618,950 | 10/1986 | Abe et al. | 369/32 |
| 4,797,752 | 1/1989 | Giddings | 369/54 |
| 4,849,956 | 7/1989 | Aizawa | 369/58 |
| 5,124,963 | 6/1992 | Ando | 369/54 |
| 5,150,339 | 9/1992 | Ueda et al. | 369/32 |

FOREIGN PATENT DOCUMENTS

| | | |
|---|---|---|
| 4225434 | 2/1993 | Germany . |
| 334156 | 2/1991 | Japan . |

OTHER PUBLICATIONS

Radio Technic, Technics of Sony MD (mini–disk), Mar. 1993, pp. 165–80, (No English Translation).
"Feature and view of mini-disk (MD) system developers tell" pp. 152–155, Dec. 1991, Radio Technic (No English Translation).
"Mini-disk is relaized by magneto–optical record and data compression technic" pp. 160–168, Dec. 9, 1991, Nikkei Electronics (No English translation).

*Primary Examiner*—Georgia Y. Epps
*Assistant Examiner*—P. W. Huber

[57] ABSTRACT

A digital signal which is recorded on a recording medium with being encoded is duplicated to another recording medium without being decoded. An audio signal is recorded and/or reproduced using data recorded in a TOG of the recording medium. A first data signal (2-channel audio signal) is intermittently recorded on and/or reproduced from a first area of the recording medium, and a second data signal (other 2-channel audio signal) is intermittently recorded on and/or reproduced from a second area of the recording medium during a period in which the first data signal is not recorded or reproduced.

8 Claims, 23 Drawing Sheets

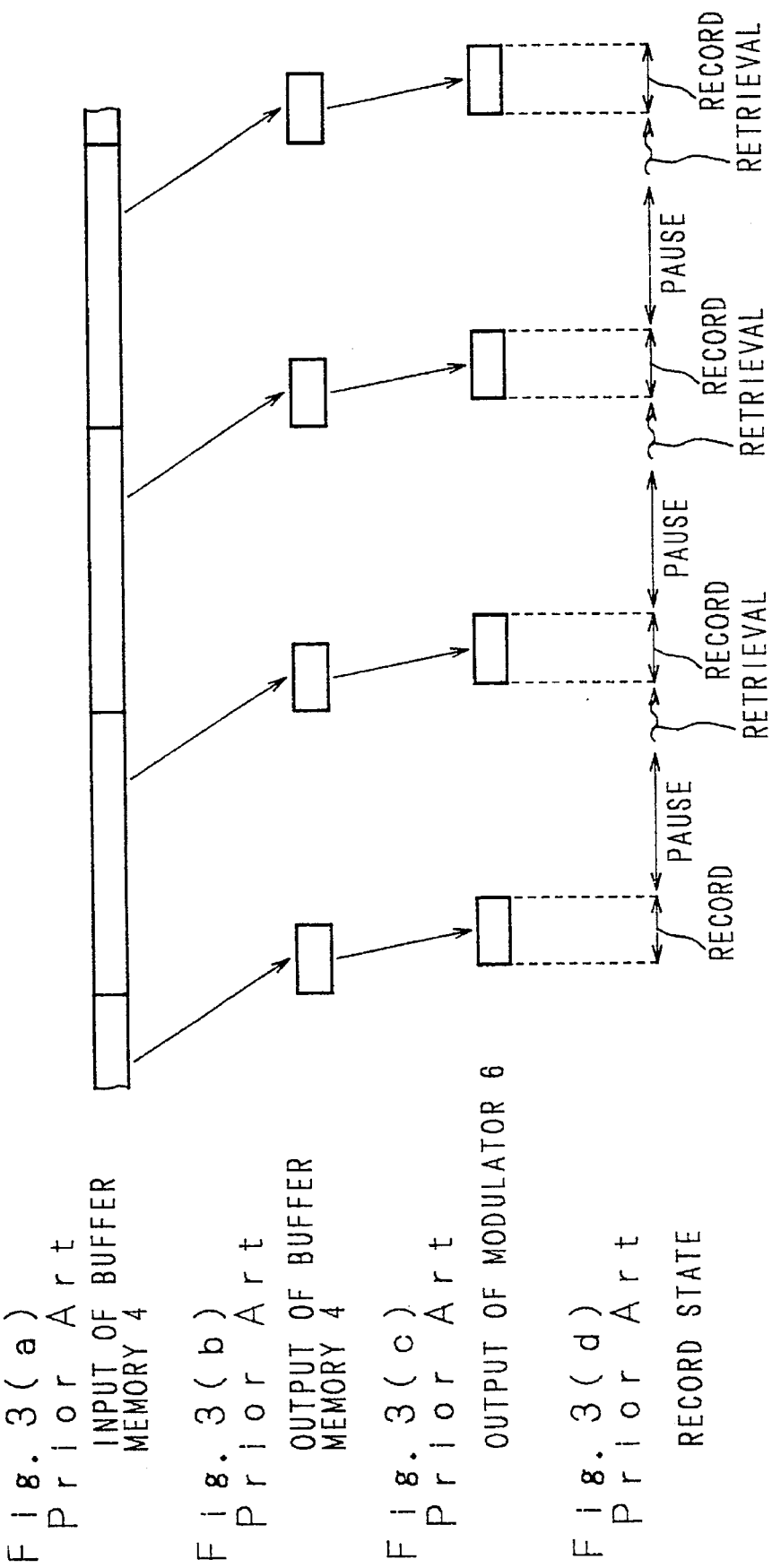

Fig. 3(e)
Prior Art
REPRODUCTION STATE

Fig. 3(f)
Prior Art
REPRODUCTION SIGNAL

Fig. 3(g)
Prior Art
INPUT OF BUFFER MEMORY 14

Fig. 3(h)
Prior Art
DATA AMOUNT OF BUFFER MEMORY 14

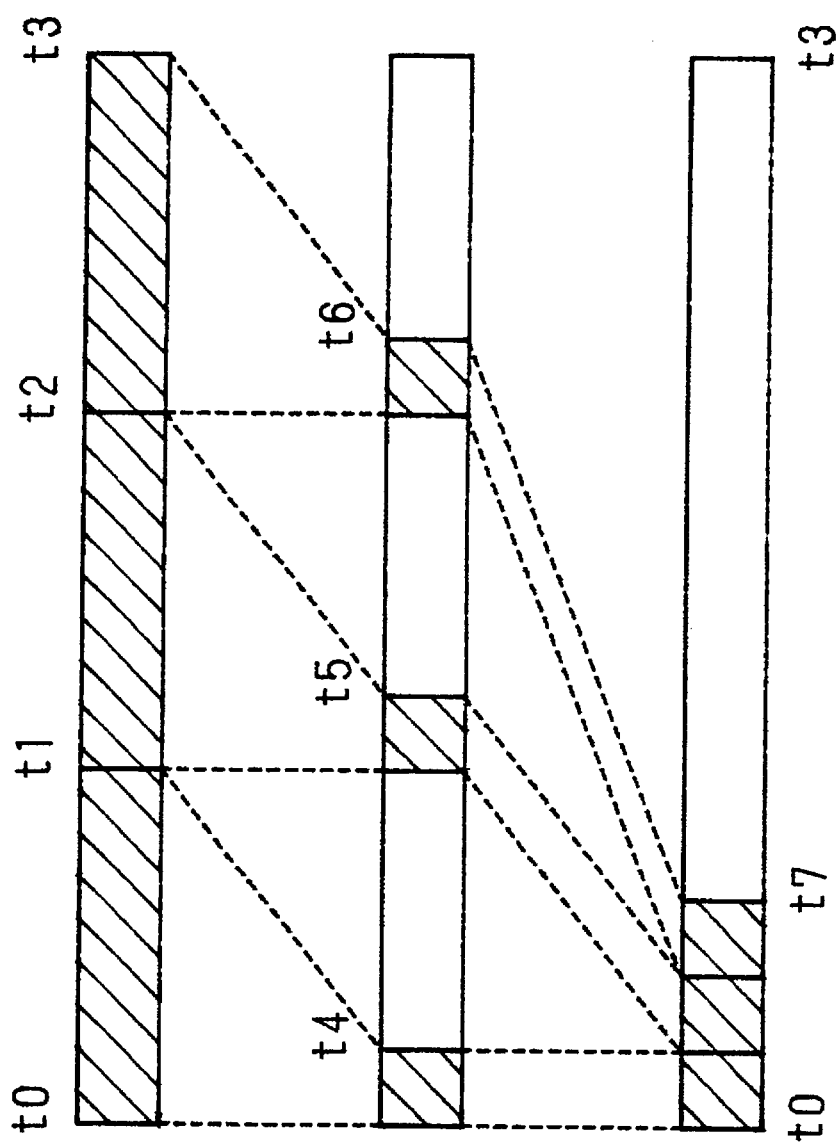

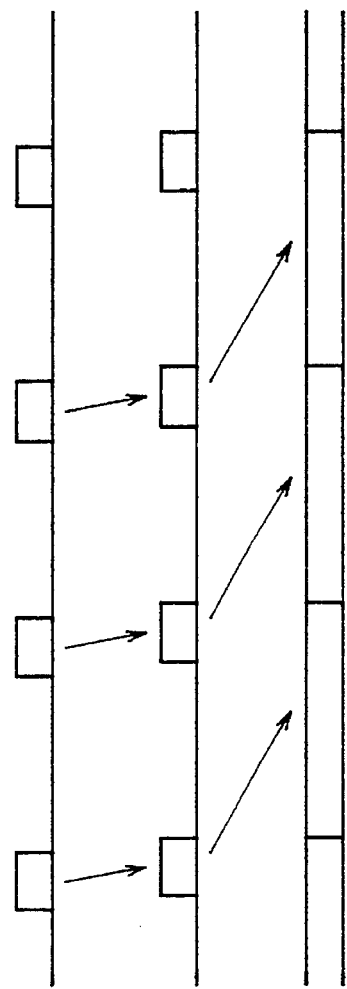
Fig. 20(a) REPRODUCTION SIGNAL
Fig. 20(b) INPUT OF BUFFER MEMORY 35a
Fig. 20(c) OUTPUT OF DECODER 15a
Fig. 20(d) OUTPUT OF ENCODER 3a
Fig. 20(e) OUTPUT OF BUFFER MEMORY 32a
Fig. 20(f) OUTPUT OF MODULATOR 6
Fig. 20(g) PROCESS TIMING

RECORD/REPRODUCTION APPARATUS FOR RECORDING/REPRODUCING MULTI-CHANNEL SIGNALS IN DIFFERENT AREAS OF A RECORDING MEDIUM

BACKGROUND OF THE INVENTION

1. Field of the Invention

The invention relates to a record-reproduction apparatus which records or reproduces data signals such as digital audio signals from a recording medium.

2. Description of the Related Art

FIG. 1 is a block diagram illustrating prior art configuration for duplicating audio signals (e.g., audio signals of music). In the figure, 43 designates a compact disk player (hereinafter abbreviated as "CD player"), and 44 designates a tape recorder. Conventionally, the duplication of audio signals requires such a configuration in which audio signals recorded on, for example, a compact disk (hereinafter, abbreviated as "CD") are reproduced by the CD player 43 and the reproduced audio signals are recorded by the tape recorder 44.

The duplication of audio signals using such a prior art method requires a period which is equal to the reproduction period of the audio signals. When the duplication is to be conducted within a shorter period (for example, a half of the reproduction period), the following steps must be performed. When the audio signals recorded on a CD are reproduced by the CD player 43 at a speed (two-time speed) which is two times the normal speed, the reproduced audio signals are recorded by the tape recorder 44 at the two-time speed. Therefore, the CD player 43 must be provided with a mechanism for reproducing at the two-time speed audio signals recorded on a CD, and additional circuits for a digital signal processing and the tape recorder 44 must be provided with a mechanism and circuits for recording signals at the two-time speed. This results in a problem in that the structure of a duplication apparatus is complicated. Furthermore, there is another problem in that, even when audio signals are to be duplicated at a high speed, the speed is limited to the two-time speed at the maximum.

Recently, digital audio apparatuses using an optical disk have been developed. A CD is a well known recording medium that can be used in a system of the reproduction-only type in which the user cannot record data on a recording medium. Known recording media on which the user can record data include a write-once optical disk which is called a "CD-R" and on which the user can record data only one time. Furthermore, researchers are developing optical disk apparatuses of the magnetooptical type in which the user can record data on a medium any number of times. An example of such an apparatus is an MD (mini-disk) system which is disclosed in "Feature and view of mini-disk (MD) system developers tell." written in PP.152–155, December, 1991, Radio Technic or "Mini-disk is realized by magnetooptical record and data compression technic" written in pp.160–168, Dec. 5, 1991, Nikkei Electronics.

In an MD system, data-compressed audio signals are magnetooptically recorded on or reproduced from a disk. In such a disk, a guide groove for performing the tracking control is previously formed, and continuous address data are previously written in the guide groove over the whole area of the disk. Therefore, irrespective of the presence of recorded signals, such a disk can be subjected to a search operation.

FIG. 2 is a block diagram of an MD system. In the figure, 1 designates a 2-channel audio signal input terminal, 2 designates an analog/digital (A/D) converter, 3 designates an encoder, 4 designates a buffer memory for recording, 5 designates an ECC encoder which generates error-correcting codes and adds them to signals, 6 designates a modulator, 7 designates a record head driving circuit, 8 designates a magnetic record head, 9 designates a disk, 10 designates an optical pickup, 11 designates a reproduction amplifier, 12 designates a demodulator, 13 designates an error controller, 14 designates a buffer memory for reproduction, 15 designates a decoder, 16 designates a digital/analog (D/A) converter, 17 designates a 2-channel audio signal output terminal, 18 designates an address decoder, 19 designates a microcomputer, 20 designates a servo circuit, 21 designates a motor, 22 designates input keys, and 23 designates a display circuit.

FIG. 3 is a timing chart illustrating the signal processing in the record and reproduction processes. Referring to FIGS. 2 and 3, the operation of the MD system will be described. Analog audio signals supplied through the audio signal input terminal 1 are sampled in the A/D converter 2 to be converted into digital signals. The digital signals are then subject to the audio signal compression and encoding process in the encoder 8 so that the data amount is reduced to about one fifth of that of the original signal.

The encoded signals are once stored in the buffer memory 4, and then intermittently read out from the buffer memory 4 at a signal rate which is equal to that before the encoding. The ECC encoder 5 conducts the interleave process for rearranging the order of signals in order to disperse possible errors in the reproduction, and also a process of generating error-correcting codes and adding them to signals. The modulator 6 performs a modulation so that the energy is concentrated on the frequency band suitable for record and reproduction and that its own clock can be extracted during the reproduction process. The signals are supplied through the record head driving circuit 7 to the magnetic record head 8 which in turn magnetooptically records the signals on the disk 9. The recording is conducted in accordance with a modulation signal (FIG. 3(c)) which is intermittently supplied. As shown in FIG. 3(d), the record state and the record pause state are alternately repeated, the last address of the portion where data have been recorded is searched before starting the recording, and data are recorded at addresses subsequent to the searched address.

In the reproduction process, signals written on the disk 9 are read out on the basis of the light beam emitted from the optical pickup 10 toward the disk 9 and reflected therefrom. The optical data are converted into electric signals by the optical pickup 10, and then supplied to the reproduction amplifier 11. The signals amplified by the reproduction amplifier 11 are supplied to the demodulator 12 and demodulated therein so that the original signal sequence is restored.

On the other hand, the output of the reproduction amplifier 11 is supplied also to the address decoder 18. The address decoder 18 reproduces signals of continuous addresses of the whole area of the disk 9 in order to pick out data contained in the optical spot groove which is previously engraved on the disk 9, and detects the wobbling of the guide grooves to obtain tracking information. The tracking information is supplied to the servo circuit 20 so that the optical pickup 10 is subjected to the tracking servo control so as to scan a predetermined guide groove, and that the motor 21 is subjected to the servo control to maintain a constant linear velocity of the disk rotation, thereby making the period of the wobbling of the guide grooves constant.

In a similar manner as the writing process in the record process, the process of reading a signal from the disk 9 is intermittently conducted, and, as shown in FIGS. 3(*e*) and 3(*f*), the reproduction state and the reproduction pause state are alternately repeated. The signals demodulated by the demodulator 12 are subjected in the error controller 13 to the error detection and error correction processes and the deinterleave process by which the signal sequence is returned to the original one. Then the signals are supplied to the buffer memory 14, and read out therefrom are provided to the decoder 15. Generally, the inputs to the buffer memory 14 are controlled so that the amount of signals stored in the memory is kept greater than a predetermined value. More specifically, as shown in FIG. 3(*h*), when data stored in the buffer memory 14 equals the memory capacity, the data input is halted and the reproduction pause state is set, and, when the data amount of the buffer memory 14 becomes less than a level indicated by a, the portion of the disk 9 subsequent to that from which data have been read out is searched and the reproduction process is conducted on the searched portion to supply data to the buffer memory 14. Therefore, the buffer memory 14 always stores at least data of the amount a even when, for example, the optical pickup 10 is erroneously caused to jump by disturbance. Therefore, the location at which the optical pickup 10 was positioned before the jump can be searched while the data stored in the buffer memory 14 are read out, so that the reproduction is conducted without interruption.

The audio signals which have been restored by the decoder 15 so as to have the data amount before encoding are converted into analog signals by the D/A converter 16 and then output through the audio signal output terminal 17. From the address decoder 18, the microcomputer 19 receives address signals engraved in the guide groove of the disk, and address signals recorded in correspondence with the audio signals. The microcomputer 19 further receives input signals from the external input keys 22, and controls the whole system. The microcomputer 19 drives the display circuit 23 to perform the display to the outside.

Also in such a disk device in which the user can record data (hereinafter, referred to as "recordable disk device"), in a similar manner as a CD, the start times of the programs are recorded in a TOC (Table Of Contents) so that the data are used for a program search, etc. during the reproduction process. Since the user can freely record data in the disk, however, the management and operation of the TOC are more difficult than those in a CD. For example, the reproduction of a CD does not produce a sense of incongruity because the time periods of so-called intermusic portions disposed between programs are substantially constant. By contrast, in a recordable disk device, the time periods of intermusic portions are divergent in length, thereby producing a problem in that a silent period corresponding to an intermusic portion may continue for a long time. When data are to be additionally recorded on a disk having a recorded portion, it is desirous to record the data efficiently using the unrecorded portion. In such a recordable disk device, accordingly, a TOC must be effectively used in both the record and reproduction processes.

Furthermore, a conventional system is provided with a measure of preventing the reproduction from being interrupted even when an optical pickup is accidentally caused to jump by a shock during the reproduction process, so that it is suitable for the use in a portable system or a system mounted in a car. In a general fixed system, however, an optical pickup is hardly caused to erroneously jump by a shock. Accordingly, it is desired to apply to another use the technique by which continuous signals are compressed and intermittently recorded and reproduced, thereby providing a new function.

SUMMARY OF THE INVENTION

It is an object of the invention to provide a record/reproduction apparatus which has a simple structure and which can duplicate data signals at a high speed and without lowering the signal quality.

It is another object of the invention to provide a record/reproduction apparatus which affords the user excellent operability, which realizes a record method or record sequence where a disk is efficiently utilized, and which realizes a reproduction method or reproduction sequence where unnatural reproduction does not occur even when data recorded by the user are reproduced.

It is a further object of the invention to provide a record/reproduction apparatus which can increase the number of channels for data signals such as digital audio signals that can be recorded and reproduced, to four or more channels.

It is a still further object of the invention to provide a record/reproduction apparatus which can realize special functions such as mixing recording.

It is a still further object of the invention to provide a record/reproduction apparatus which can improve the reliability of recorded and reproduced signals.

A record/reproduction apparatus according to the invention is an apparatus for recording on and/or reproducing from a disk-like recording medium encoded data signals, and has reproduction control means for continuously reproducing data which are encoded and recorded on the recording medium, and record control means for continuously recording on another recording medium the encoded data without being decoded or with remaining encoded, The record/reproduction apparatus further has a switch for, in the record or reproduction process, selecting a signal which is continuously reproduced with remaining encoded, and for, in the duplication process, selecting a signal which is encoded by data encoding means and intermittently supplied.

Another record/reproduction apparatus according to the invention records in and/or reproduces from a TOC subcode data relating to programs including program times of the programs and data indicative of positions on a disk. When new data are to be recorded on a recorded disk, these data in the TOG are previously reproduced, a recordable area is judged on the basis of the data, and the recording is conducted while searching the recordable area. The recordable time corresponding to the judged recordable area is displayed. A number corresponding to an arbitrary program in data signals which are already recorded is designated, and the recording of data signals is controlled using the designated number and the previously reproduced data of the TOC. The recording of data signals is started at the start position of the program of the designated number. When the program area is ended, the recording is jumped to the start position of a free record area which is judged from the subcode data, and the recording is resumed. In the reproduction process, the TOC is first read out, addresses in reproduced signals are monitored, and the process jumps from the end position of a program to the start position of the next program to be reproduced to continue the reproduction. The length of a blank between adjacent programs is previously obtained. The control is conducted so that, only when the blank is longer than a predetermined value, the jumping operation is conducted. Even when programs are separated by a blank, the blank can be skipped so that the reproduction is conducted as if the music are continuously reproduced.

A record apparatus of the invention is an apparatus for intermittently recording data signals on a disk, and has record means for recording data signals on the disk, move means for moving the record means in a radial direction of the disk, and processing means for processing data signals so that data signals are supplied to the record means in correspondence with a period in which the record means conducts a recording. A first data signal is recorded in a first area of the disk, during a period in which the recording of the first data signal is not conducted, the record means is moved to a second area of the disk and a second data signal is recorded in a second area, the record means is moved again to the original area, and the first data signal is recorded in a portion subsequent to a portion in which the recording is previously conducted.

A reproduction apparatus of the invention is an apparatus for intermittently reproducing data signals recorded on a disk, and has reproduction means for reproducing data signals from the disk, move means for moving the reproduction means in a radial direction of the disk, and processing means for receiving and processing data signals obtained from the reproduction means in correspondence with a reproduction period. A first data signal is reproduced from a first area of the disk, during a period in which the reproduction of the first data signal is not conducted, the reproduction means is moved to a second area of the disk and a second data signal is reproduced from a second area, the reproduction means is moved again to the original area, and the first data signal is reproduced from a portion subsequent to a portion in which the reproduction is previously conducted.

Another reproduction apparatus of the invention is an apparatus for intermittently reproducing data signals recorded on a disk, and has reproduction means for intermittently reproducing a first data signal from at least a first area of the disk, and for reproducing a second data signal from a second area of the disk during a period in which the reproduction of the first data signal is not conducted, and mixing means for mixing the reproduced first and second data signals with each other. In a first reproduction mode, a signal in which the first and second data signals are mixed with each other by the mix means is output, and, in a second reproduction mode, either of the first data signal and the second data signal is selectively output.

A further reproduction apparatus of the invention is an apparatus for intermittently reproducing data signals recorded on a disk, and has reproduction means for intermittently reproducing a first data signal from at least a first area of the disk, and for reproducing a second data signal from a second area of the disk during a period in which the reproduction of the first data signal is not conducted, the contents of the second data signal being identical with those of the first data signal, and judge means for judging reliabilities of the reproduced first and second data signals, one of the data signals which is judged by the judge means to have a higher reliability is selectively output.

A further record/reproduction apparatus of the invention is an apparatus for intermittently recording on and/or reproducing from a disk data signals, and has record/reproduction means for recording on and/or reproducing from the disk data signals, move means for moving the record/reproduction means in a radial direction of the disk, record signal processing means for processing data signals so that data signals are supplied to the record/reproduction means in correspondence with a period in which the record/reproduction means conducts a recording, and reproduction signal processing means for receiving and processing data signals obtained from the record/reproduction means in correspondence with a reproduction period. A first data signal is recorded in a first area of the disk, during a period in which the recording of the first data signal is not conducted, the record/reproduction means is moved to a second area of the disk and a second data signal is reproduced from the second area. The record/reproduction means is moved again to the original area, and the first data signal is recorded in a portion subsequent to a portion in which the recording is previously conducted.

The above and further objects and features of the invention will more fully be apparent from the following detailed description with accompanying drawings.

BRIEF DESCRIPTION OF THE DRAWINGS

FIG. 3(a) is a timing chart illustrating the operation of the apparatus of FIG. 2;

FIG. 3(b) is a timing chart illustrating the operation of the apparatus of FIG. 2;

FIG. 3(c) is a timing chart illustrating the operation of the apparatus of FIG. 2;

FIG. 3(d) is a timing chart illustrating the operation of the apparatus of FIG. 2;

FIG. 3(e) is a timing chart illustrating the operation of the apparatus of FIG. 2;

FIG. 3(f) is a timing chart illustrating the operation of the apparatus of FIG. 2;

FIG. 3(g) is a timing chart illustrating the operation of the apparatus of FIG. 2;

FIG. 3(h) is a timing chart illustrating the operation of the apparatus of FIG. 2;

FIG. 7(a) is a timing chart of the data duplication process of the apparatus of FIG. 4;

FIG. 7(b) is a timing chart of the data duplication process of the apparatus of FIG. 4;

FIG. 7(c) is a timing chart of the data duplication process of the apparatus of FIG. 4;

FIG. 20(a) is a timing chart illustrating the record/reproduction process of the apparatus of FIG. 14;

FIG. 20(b) is a timing chart illustrating the record/reproduction process of the apparatus of FIG. 14;

FIG. 20(c) is a timing chart illustrating the record/reproduction process of the apparatus of FIG. 14;

FIG. 20(d) is a timing chart illustrating the record/reproduction process of the apparatus of FIG. 14;

FIG. 20(e) is a timing chart illustrating the record/reproduction process of the apparatus of FIG. 14;

FIG. 20(f) is a timing chart illustrating the record/reproduction process of the apparatus of FIG. 14; and FIG. 20(g) is a timing chart illustrating the record/reproduction process of the apparatus of FIG. 14.

DESCRIPTION OF THE PREFERRED EMBODIMENTS

Hereinafter, the invention will be described in detail with reference to the drawings showing its embodiments.

EMBODIMENT 1

Figure 1:
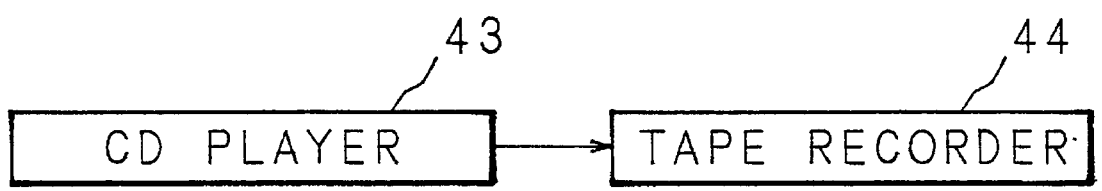
FIG. 1 is a block diagram of a prior art apparatus for duplicating audio signals.
Figure 2:
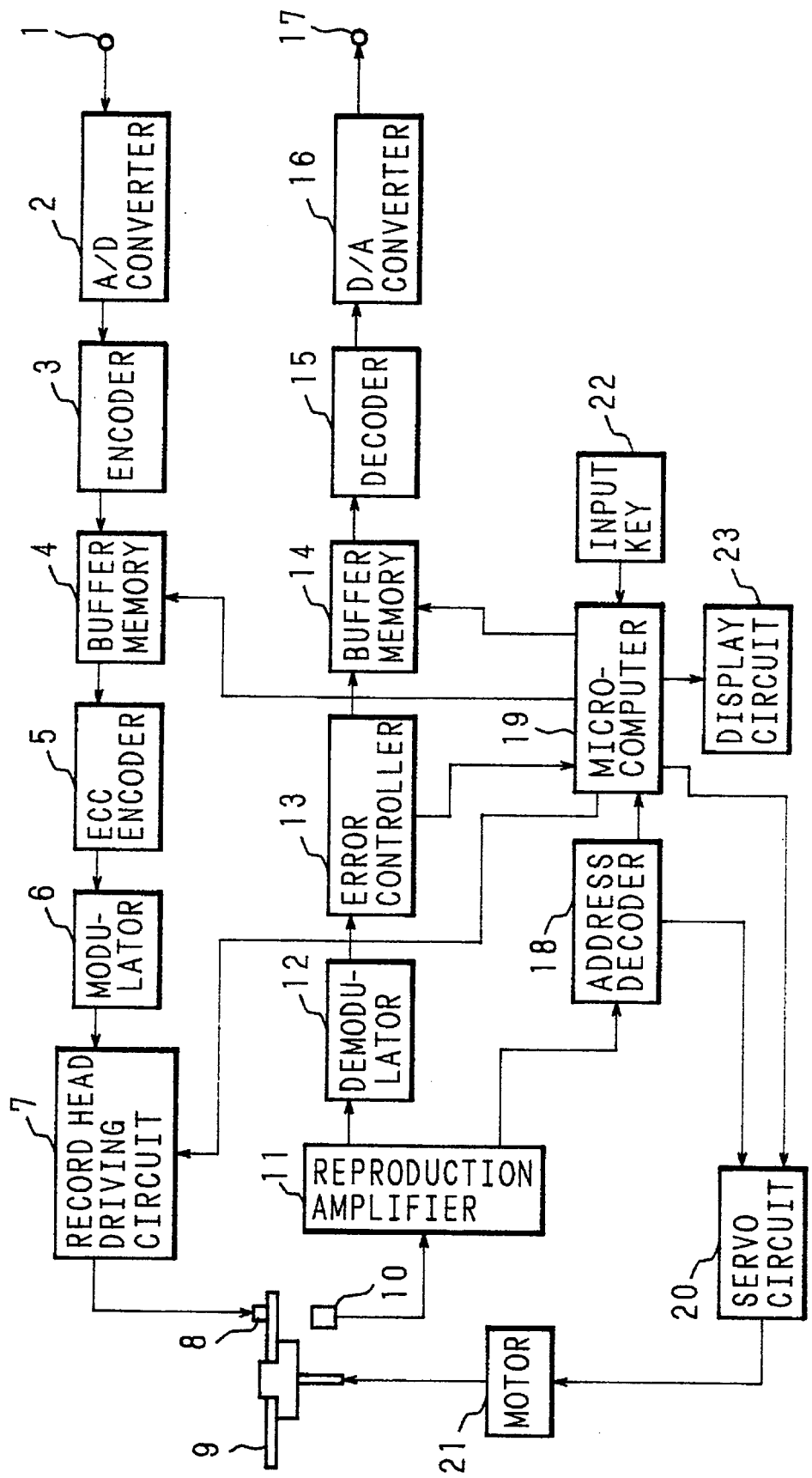
FIG. 2 is a block diagram of a prior art record/reproduction apparatus.
Figure 4A:
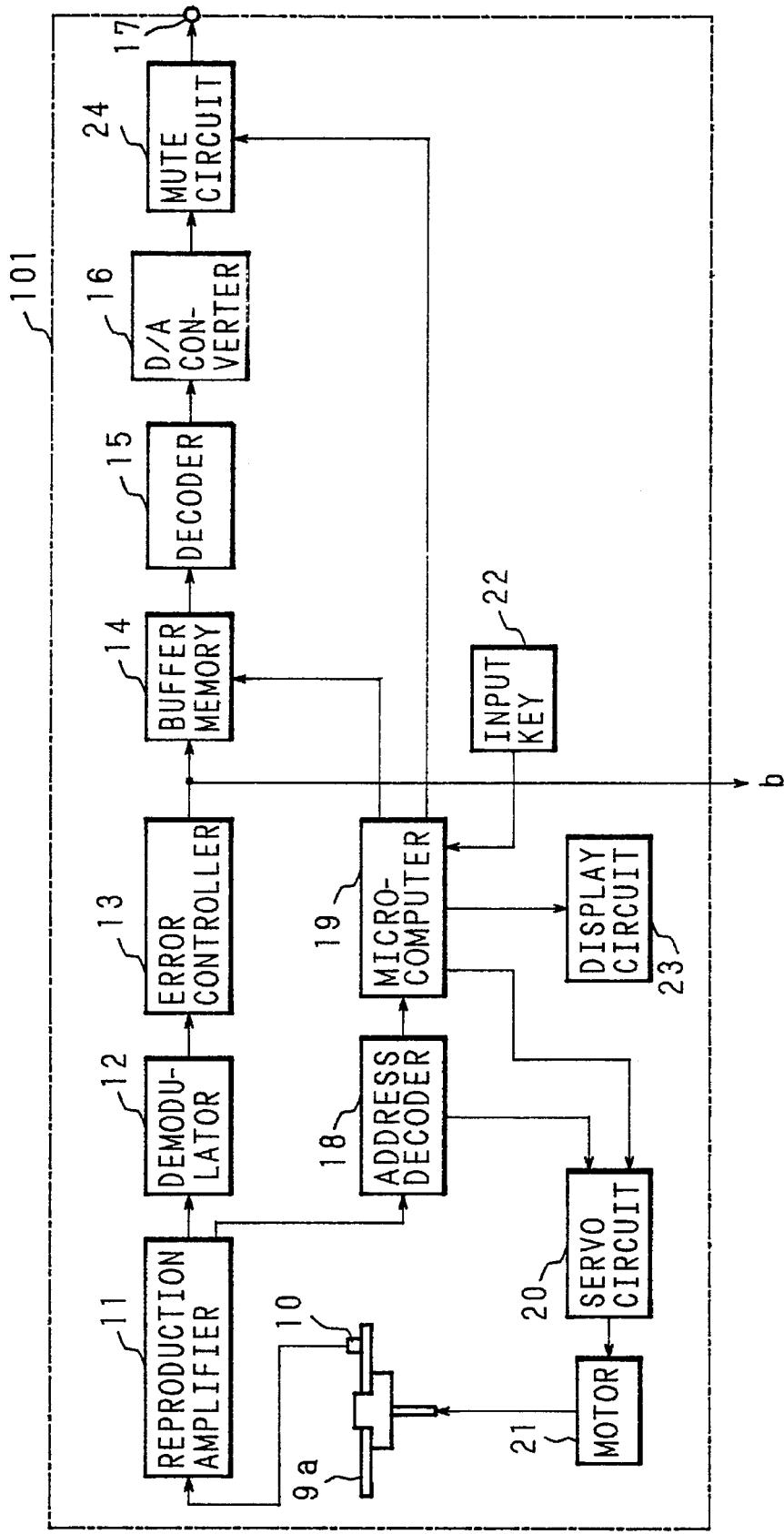
FIG. 4(a) is a block diagram of a record/reproduction apparatus according to the invention.
Figure 4B:
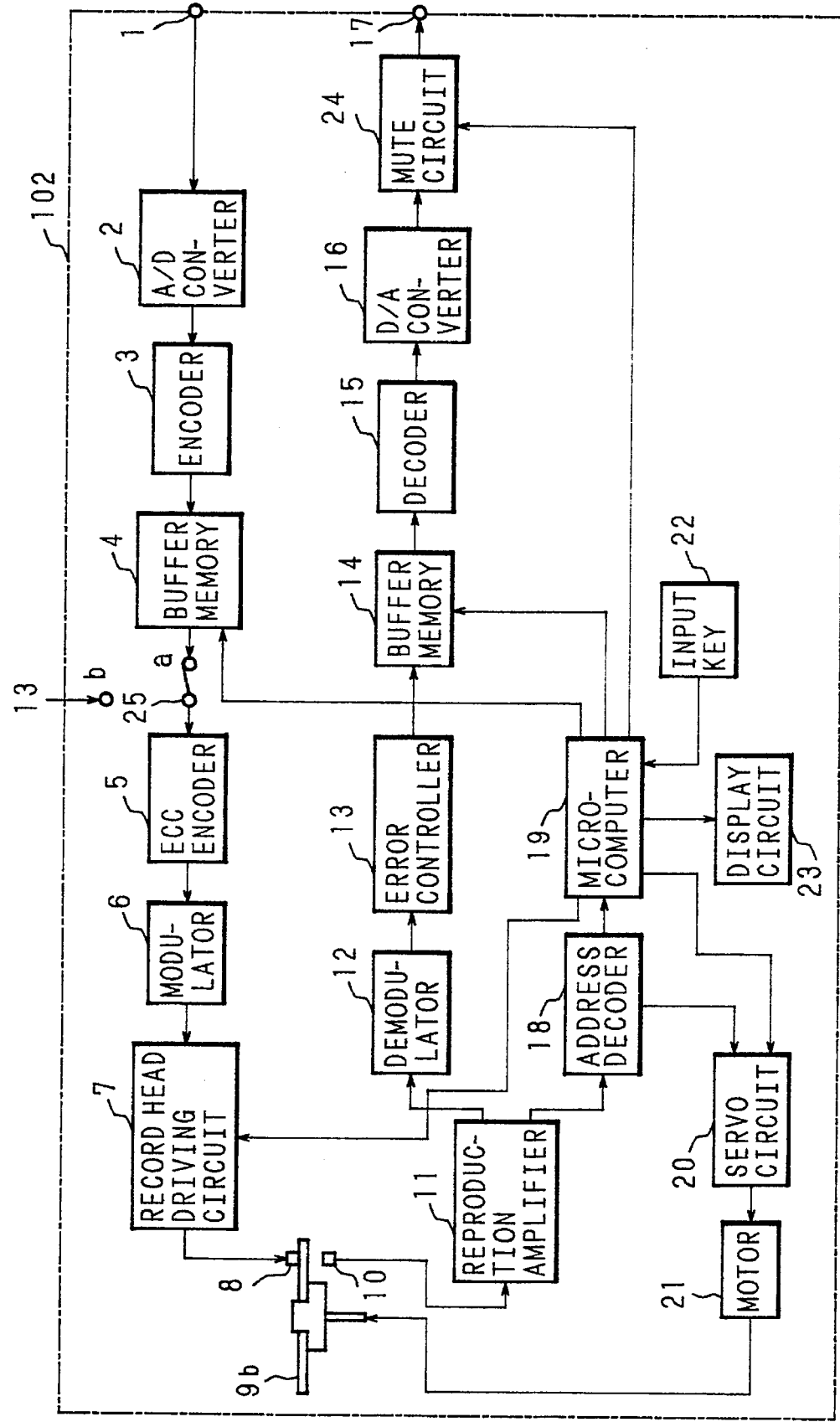
FIG. 4(b) is a block diagram of a record/reproduction apparatus according to the invention.

FIG. 4 is a block diagram of a record/reproduction apparatus according to the invention in which an optical disk such as an MD is used. In the figure, 101 designates a system for reproduction, and 102 designates a system for record/reproduction. Portions of FIG. 4 designated by the same reference numerals are identical or correspondent to those of FIG. 2, and therefore their description is omitted. In FIG. 4, 9a designates a recorded disk, 9b designates a disk for record/reproduction, 24 designates a mute circuit, and 25 designates an input changeover switch.

Referring to FIG. 4, the operation of recording and reproducing audio signals will be described. Hereinafter, the record/reproduction system 102 will be described. When a normal record/reproduction is to be conducted, the input changeover switch 25 is operated so as to select the contact a. Analog audio signals supplied through the audio signal input terminal 1 are sampled and quantized in the A/D converter 2 to be converted into digital signals, and then supplied to the encoder 3. In the encoder 3, the digital signals are subjected to a so-called high-efficiency encoding process for sound signals so that the data amount is reduced to about one fifth of the original signal data amount. Examples of a useful high-efficiency encoding process are an encoding method using a transform encoding such as DCT (Discrete Cosine Transform coding) or a band division, and a method which reduces the amount of unnecessary data by using these encoding methods, human acoustic characteristics, etc.

Figure 5:
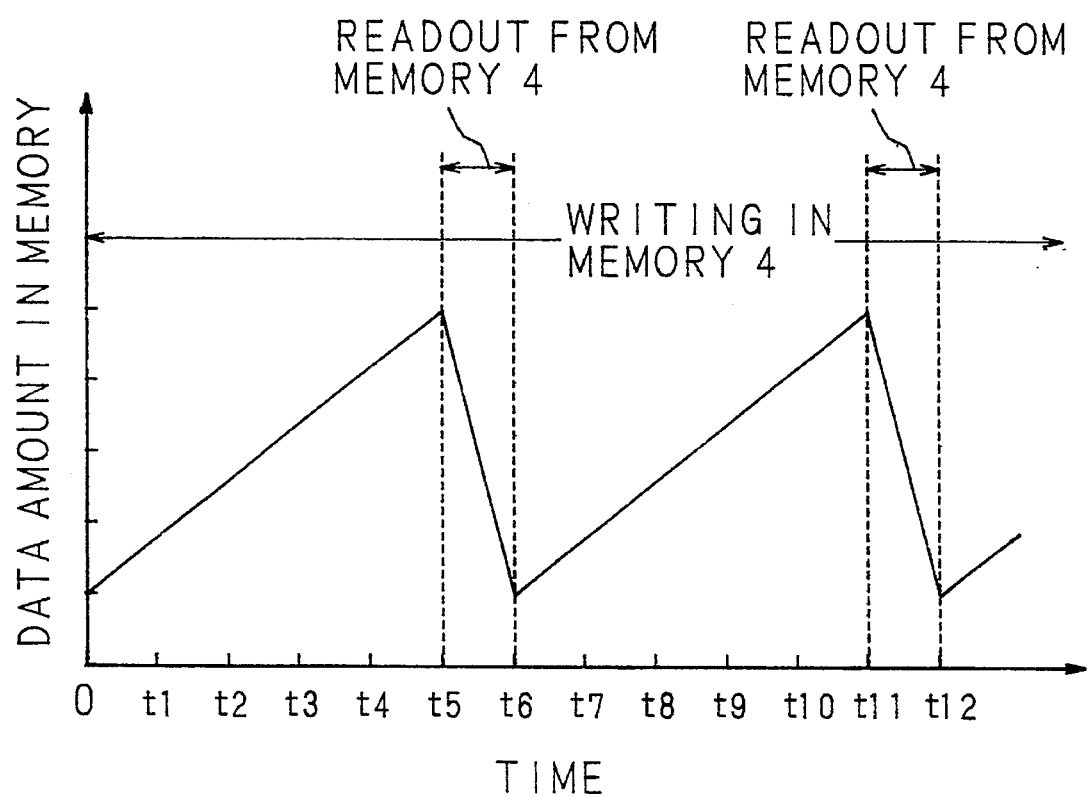
FIG. 5 is a graph showing the variation with time of the data amount in a buffer memory of the apparatus of FIG. 4 during the record process.

The encoded signals are once stored in the buffer memory 4. In order to read out the signal which has been encoded to ⅕ at a signal rate equal to that before the encoding, the writing of the signals to the buffer memory 4 is continuously conducted, and the readout of the signals from the buffer memory 4 is intermittently conducted. FIG. 5 shows the variation with time of the amount of data stored in the buffer memory 4. As shown in the figure, the signal sequence written in the buffer memory 4 during times 0 to t5 is read out from the buffer memory 4 during times t5 to t6. Similarly, the signal sequence written in the buffer memory 4 during times t5 to t11 is read out from the buffer memory 4 during times t11 to t12.

The ECC encoder 5 conducts the interleave process for rearranging the order of signals in order to disperse possible errors in the reproduction, and also a process of generating error-correcting codes and adding them to the signals. The modulator 6 in the next stage performs a modulation such as EFM (Eight to Fourteen Modulation), so that the energy is concentrated on the frequency band suitable for recording and reproduction and that its own clock can be extracted during the reproduction process.

The signals are supplied through the record head driving circuit 7 to the magnetic record head 8 which in turn records the signals on the disk 9b. In an magnetooptical recording, for example, while a laser light spot is irradiated on the region in which data is to be recorded, by the optical pickup 10 to raise the temperature of the region so as to erase the residual magnetism, the magnetic record head 8 forms new records. The recording is intermittently conducted in accordance with signals which are intermittently read out from the buffer memory 4 during, for example, times t5 to t6 and times t11 to t12 of FIG. 5. Namely, the recording is conducted while the record state and the pause state are alternately repeated.

In the reproduction process, signals written on the disk 9b are read out on the basis of the light beam emitted from the optical pickup 10 toward the disk 9b and reflected therefrom. The optical data are converted into electric signals by the optical pickup 10, and then supplied to the reproduction amplifier 11. The signals amplified by the reproduction amplifier 11 are supplied to the demodulator 12 and subjected to a demodulation process such as EFM so that the original signal sequence is restored.

On the other hand, the output of the reproduction amplifier 11 is supplied also to the address decoder 18. The address decoder 18 reproduces signals of continuous addresses of the whole area of the disk 9b in order to pick out data contained in the optical spot groove which is previously engraved on the disk 9b, and detects the wobbling of the guide groove to obtain tracking information. The tracking information is supplied to the servo circuit 20 so that the optical pickup 10 is subjected to a tracking servo control so as to scan a predetermined guide groove, and that a servo control for maintaining a constant linear velocity of the disk rotation is conducted to make the period of the wobbling of the guide groove constant.

Figure 6:
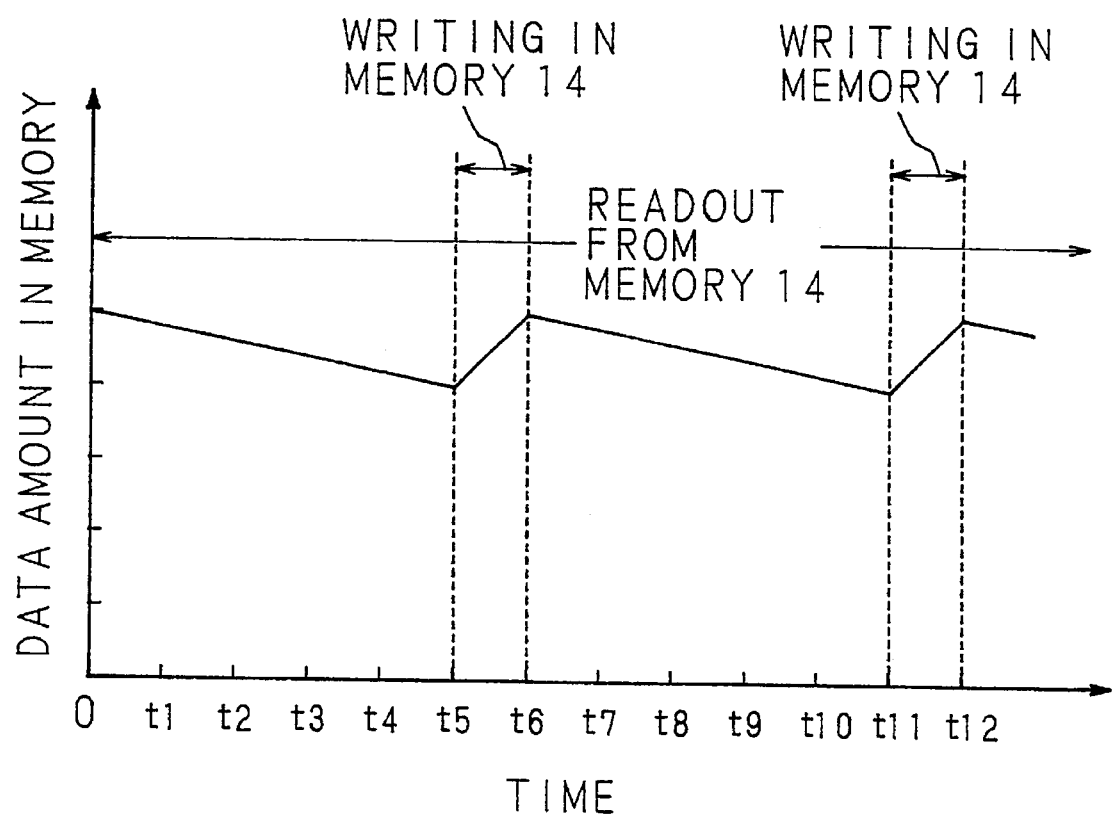
FIG. 6 is a graph showing the variation with time of the data amount in a buffer memory of the apparatus of FIG. 4 during the reproduction process.

The error controller 13 corrects errors of the signal sequence restored by the demodulator 12, using error correction codes included in the restored signal sequence, and changes the signal sequence which has been rearranged in the interleave process, to the original one. The buffer memory 14 once stores data which are intermittently input thereto, and outputs them continuously. FIG. 6 shows the variation with time of the data amount stored in the buffer memory 14. As shown in the figure, when the buffer memory 14 is filled with data at time 0, the writing of data to the buffer memory 14 is halted, and the address on the disk 9b at time 0 is stored.

Then, during times 0 to t5, data are read out from the buffer memory 14. When the data amount in the buffer memory 14 is reduced, the corresponding microcomputer 19 sends a control signal to the servo circuit 20 to control the motor 21 so as to return the optical pickup 10 at time t5 to the location corresponding to the address which was stored at time 0, and the reproduction process is continued. Also during the period from time t5 to time t6, data are kept to be continuously read out.

Similarly, when the buffer memory 14 is filled with data at time t6, the writing of data to the buffer memory 14 is halted, and the address on the disk 9b at time t6 is stored. During times t6 to t11, data are read out from the buffer memory 14. Then, the optical pickup 10 is returned at time t11 to the location corresponding to the address which was stored at time t6, and the reproduction process is continued. In other words, the writing of signals to the buffer memory 14 is intermittently conducted, and the readout of signals from the buffer memory 14 is continuously conducted.

The decoder 15 decodes the encoded data to restore digital audio signals having the original time sequence. The restored signals are output from the audio signal output terminal 17 through the D/A converter 16 as analog audio signals. On the basis of reproduced subcode data, the microcomputer 19 controls various record/reproduction processes of the servo circuit 20, the buffer memory 14, etc.

In the above, the operation of the record/reproduction system 102 has been described. The reproduction-only system 101 operates in the same manner as the reproduction operation of the record/reproduction system 102.

It is assumed, that audio signals are previously recorded on the recorded disk 9a by encoding, for example, data between times t0 to t1, t1 to t2 and t2 to t3 shown in FIG. 7(a) to ⅕, and that the data are read out at a signal rate which is equal to that before the encoding. As shown in FIG. 7(b), the periods required for reading out the data are those between times t0 to t4, t1 to t5 and t2 to t6, respectively. When the encoded data are continuously read out at the signal rate which is equal to that before the encoding and then continuously recorded on the disk 9b for recording, the audio signal sequence between times t0 to t3 is duplicated between times t0 to t7 as shown in FIG. 7(c), with the result that the period required for duplicating the data is shorter by the period from time t7 to time t3 than that required for duplicating data without encoding.

Next, the duplicating operation will be described. When audio signals are to be duplicated, the input changeover switch 25 is operated so as to select the contact b, and the microcomputers 19 send a control signal to the respective mute circuits 24 so that no audio signals are output from the audio signal output terminals 17. In this case, unlike the usual reproduction process described above, the microcomputer 19 sends a control signal to the servo circuit 20 so as to continuously reproduce signals written on the recorded disk 9a.

The signals written on the recorded disk 9a are converted into electric signals by the optical pickup 10, and then supplied to the reproduction amplifier 11. The signals amplified by the reproduction amplifier 11 are supplied to the demodulator 12 to be subjected therein to a demodulation process such as EFM to restore the original signal sequence, and then supplied to the error controller 13. The error controller 13 corrects errors of the signal sequence restored by the demodulator 12, using error-correcting codes included in the restored signal sequence, and changes the signal sequence which has been rearranged in the interleave process, to the original one. The signals are supplied to the encoder 5 through the input changeover switch 25.

The ECC encoder 5 conducts the interleave process and a process of generating error-correcting codes and adding them to the signals. The modulator 6 performs a modulation such as EFM. The signals are then supplied through the record head driving circuit 7 to the magnetic record head 8 which in turn records the signals on the disk 9b for record. In this record process, unlike a normal record process where the recording is conducted intermittently, the microcomputer 19 sends a control signal to the servo circuit 20 so that the recording is conducted continuously, thereby completing the process of duplicating the audio signals.

In embodiment 1, the reproduction-only system 101 is provided with the microcomputer 19 dedicated to the system. Alternatively, the processes of this microcomputer may be conducted by the microcomputer 19 of the record/reproduction system 102. The function of the microcomputers 19 for controlling the buffer memories 14 may be realized by logic circuits.

Embodiment 1 having the configuration described above can attain the following effects:

(1) Since audio signals recorded with encoding can be duplicated as they are without decoding, it is possible to duplicate audio signals at a high speed.

(2) A digital audio signal record/reproduction apparatus can be easily configured only by providing an apparatus in which audio signals are recorded and/or reproduced while being encoded, with a switch for selectively supplying either of a signal which is continuously reproduced while being kept encoded and an intermittent signal which is compressed by data encoding means, and also with control means for continuously recording and reproducing data which is recorded on a medium while being kept encoded.

EMBODIMENT 2

Figure 8A:
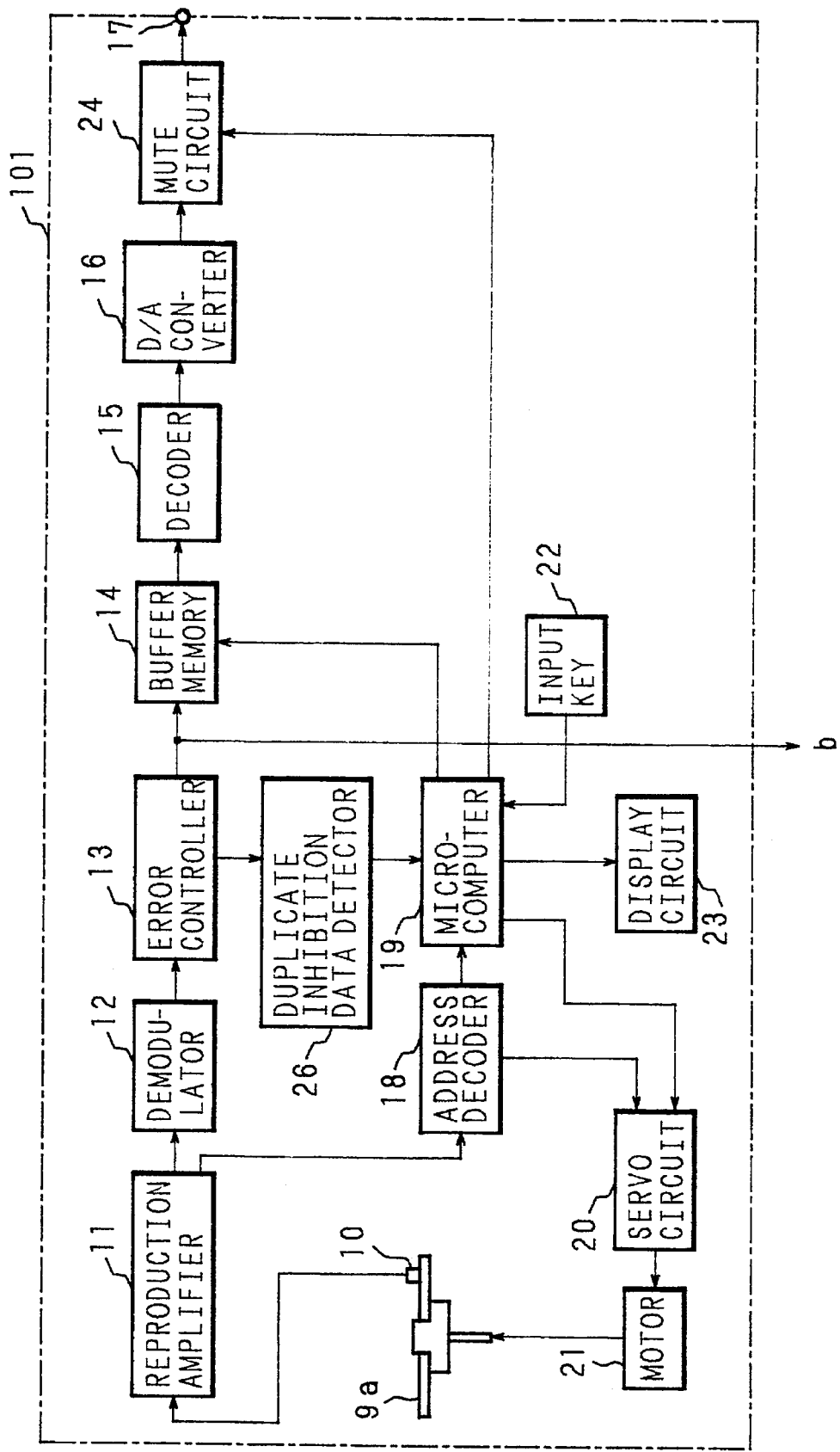
FIG. 8(a) is a block diagram of another record/reproduction apparatus according to the invention.
Figure 8B:
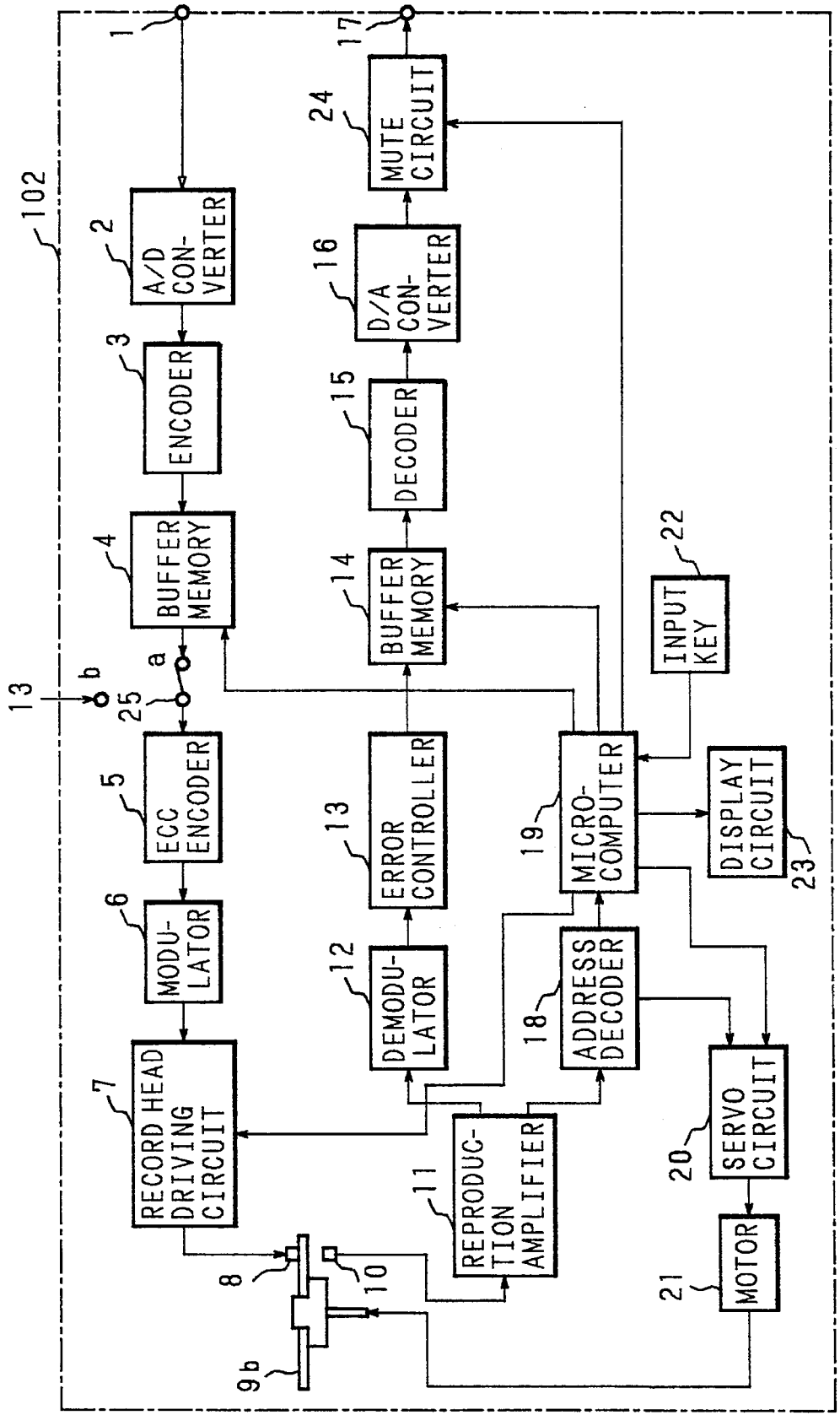
FIG. 8(b) is a block diagram of another record/reproduction apparatus according to the invention.

Embodiment 1 may be further provided with a system such as SCMS (Serial Copy Management System) or a system equivalent to SCMS, for inhibiting a free copy of a copyrighted digital audio signal. FIG. 8 is a block diagram showing embodiment 2. In FIG. 8, portions designated by the same reference numerals are identical or correspondent to those of FIG. 4, and therefore their description is omitted. The reference numeral 26 designates a duplicate inhibition data detector for detecting duplicate inhibition data. The duplicate inhibition data are recorded as subcode data, and written in an area for digital audio signals, or in an area independent from the digital audio signal area and specially provided for subcode data.

The operation will now be described. Signals read out from the recorded disk 9a are subjected to the same processes as that in embodiment 1, and then supplied to the error controller 13. The signal sequence which has been subjected to error correction and rearranged to the original order is sent to the buffer memory 14, and the duplicate inhibition data among the subcode data are sent to the duplicate inhibition data detector 26. If the duplicate inhibition data are detected, the duplicate inhibition data detector 26 sends a control signal to the microcomputer 19 which in turn generates a control signal to immediately stop the reproduction process, thereby inhibiting the duplication.

It is a matter of course that the control may be done so as to stop the recording. Alternatively, the duplicate inhibition data recorded in the subcode data area may be read out in advance of the readout of audio signals, and the duplication may be enabled or not, depending on the judgment result of the duplicate inhibition data.

The apparatus of embodiment 2 is provided with the duplicate inhibition data detector 26. Alternatively, the function of this detector may be conducted by the microcomputer 19.

In embodiment 2 which is provided with the circuit for detecting duplicate inhibition data, the allowance of duplication can be determined depending on the existence of detecting duplicate inhibition data. Therefore, embodiment 2 has an effect of inhibiting unrestricted duplication of a copyrighted digital audio signal.

Next, apparatuses in which subcode data relating to data signals are recorded in a TOC to be used in the reproduction process will be described as embodiments 3 to 7. The configuration and basic record and reproduction operation of these apparatuses are the same as those of the prior are apparatus of FIG. 2, but the control operation of the microcomputer 19 is different.

EMBODIMENT 3

Table 1 below shows an example of a data arrangement in a TOC.

TABLE 1

| Program number | Program start position | Program time (Address amount) |
|---|---|---|
| 001 | 0000 | 0051 |
| 002 | 0054 | 0044 |
| 003 | 0100 | 0036 |
| 004 | 0137 | 0093 |
| 005 | 0256 | 0036 |
| . | . | . |
| . | . | . |
| . | . | . |

Figure 9:
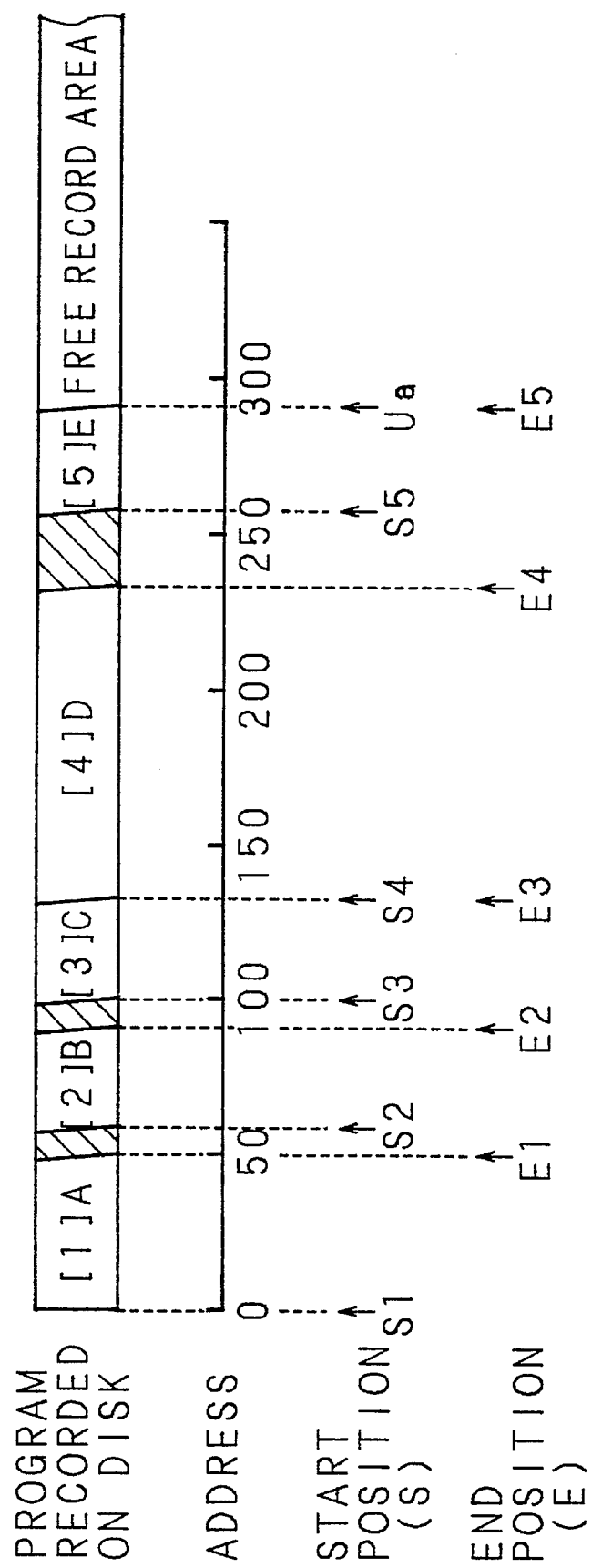
FIG. 9 is a diagram showing a program arrangement on a disk which corresponds to the contents of a TOG.

The contents of this TOC are collectively recorded in an area other than the area for recording audio signals, for example, in a lead-in area. In this example, program numbers, program start positions respectively corresponding to the program numbers, and program times of the programs in terms of address amount are recorded in the TOC. An example of a music arrangement on the disk is shown in FIG. 9. In this example, five pieces of musics A to E which are respectively designated by program numbers (music numbers) [1] to [5] are recorded on the disk 9, and the succeeding area is a free record area. The hatched portions between the musics A to E are blanks between adjacent musics. The data of the program start positions in the TOC correspond to positions S1 to S5 shown in (S) of FIG. 9, respectively.

After the disk 9 is placed in the apparatus, the apparatus first reads the TOC data. That is, the TOC data listed in Table 1 are read out from the lead-in area and stored in the internal memory of the microcomputer 19. The microcomputer 19 decodes the TOC data, and calculates the total number of music pieces written on the disk 9 and the total time of the music pieces. These calculated values are displayed by the display circuit 23. When one address corresponds to 5 sec., for example, "TOTAL NUMBER OF MUSIC PIECES: 5" and "TOTAL TIME: 21 MIN AND 5 SEC" are displayed. In an actual disk, addresses are assigned more finely, or 60 or 100 addresses are assigned per second. On the basis of the program times and start addresses of the programs, the microcomputer 19 further calculates the times of the blanks between adjacent music pieces and the time of the free record area, and controls the display circuit 23 so as to display the recordable time of the disk. When the disk 9 is a disk having the total recording time of 60 min., for example, "RECORDABLE TIME: 39 MIN AND 55 SEC" is displayed.

Figure 10:
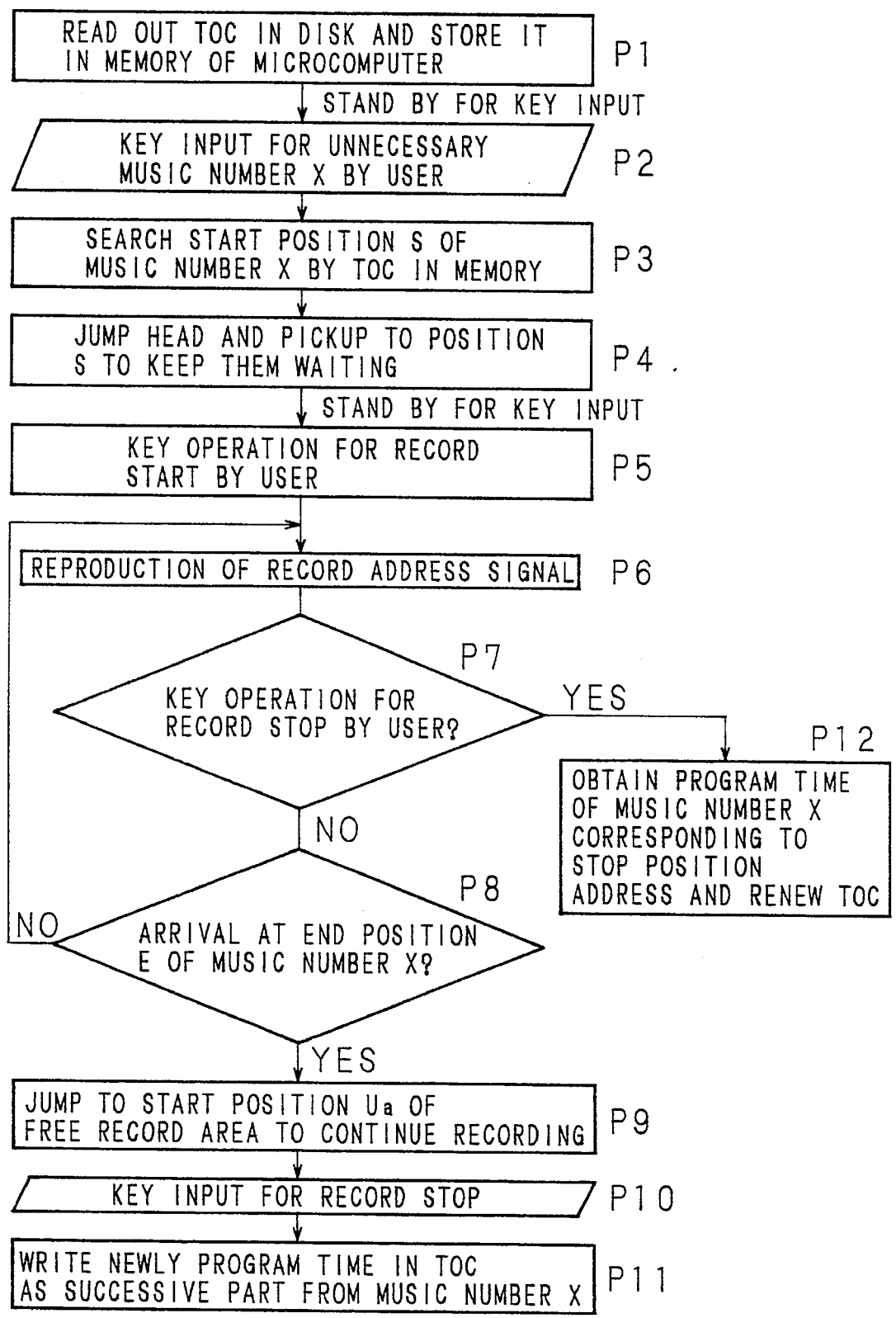
FIG. 10 is a flowchart illustrating a record sequence.

Next, the recording sequence will be specifically described. FIG. 10 is a flowchart illustrating an example of the record sequence in which one of the prerecorded music pieces is erased and a new music piece is recorded in the area of the erased music piece. In this case, after the process of reading the TOC data (Step P1), the user operates the input keys 22 to designate the number of the music piece which is to be erased (Step P2). When program D in Table 1 is to be replaced with a new music piece, for example, music number [4] is designated. From the TOG data which are previously read out, the microcomputer 19 recognizes that the start position S4 of music number [4] is at address 137 (Step P3). The record head and optical pickup are controlled to jump to and wait at the position so that the recording can be started at the position (Step P4). In response to the key operation for record start by the user (Step P5), the recording is started. During the record process, addresses engraved in the guide groove are kept to be reproduced and monitored (Step P6). When the key operation for record slop is done before the current address arrives at the end position E4 (=230) of music number [4] which is calculated from the program time (YES in Step P7), a program time is calculated from the address of this stop position, and written as the new program time of music number [4] to update the data of the internal memory of the microcomputer 19, and also the TOG on the disk is updated (Step P12).

In contrast, when the current address arrives at the end position E4 of music number [4] during the record process (YES in Step P8), the record head optical pickup are jump from this position to the start position Ua (=298) of the free record area, and the recording is resumed at this position Ua (Step P9). The position Ua can be obtained from the program times. When the key operation for record stop is done (Step P10), the microcomputer 19 stores the address of the stop positions. On the basis of the position Ua and the address of the stop position, the program time of this newly recorded portion is obtained, and written to the TOC on the disk (Step P11).

The newly recorded portion is a succession of music number [4]. It is desirable that this is readily recognized during the reproduction process from the contents of the TOC. This desire can be accomplished by modifying the TOG so that, when the area for music number [4] is divided into plural portions, data (e.g., marking of 1) indicative of the presence of such a successive portion of music are recorded in the TOC.

EMBODIMENT 4

Another recording method will be described by illustrating the record sequence of FIG. 11 in which new data are recorded without erasing a prerecorded music piece. When, after reading the TOC (Step P21), the user performs the key operation for record start (Step P22), the microcomputer 19 judges the start position Ua of the free record area on the basis of the TOC data such as listed in Table 1 stored in the internal memory, and searches its address position on the disk (Step P23). Then, the record state or the record pause state is started at this address position (Step P24). After the key operation for record stop is done (Step P25), a program time is written to the TOC in correspondence with the program number following program number [5] of the prerecorded music (Step P26).

EMBODIMENT 5

Figure 12:
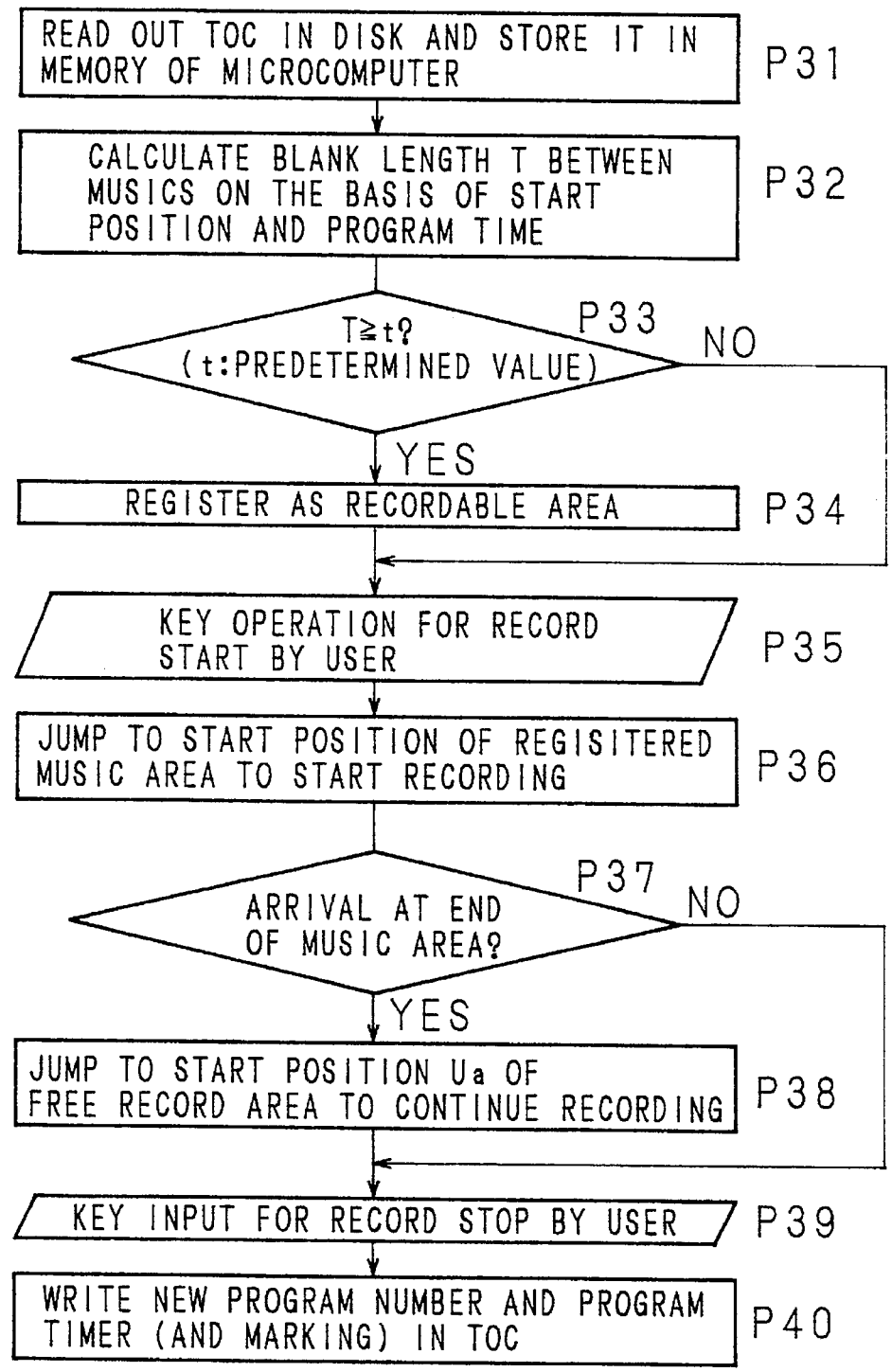
FIG. 12 is a flowchart illustrating a further record sequence.

FIG. 12 shows a recording sequence in which blanks between adjacent music pieces are used. Also in this embodiment, new data is recorded without erasing a prerecorded music piece, and this embodiment has a higher recording efficiency than embodiment 4. After the process of reading the TOC data (Step P31), the microcomputer 19 judges a blank between adjacent music pieces on the basis of the TOC data (Step P32), and judges whether the blank length is sufficient for recording data or not (Step P33). When the blank length is longer than 20 sec., for example, the process of recording data in the blank is set. The period of 20 sec. corresponds to 4 addresses. When the address difference T between the end position of a program and the start position of the next program is equal to or longer than t=4, therefore, the microcomputer 19 judges that the blank is a recordable area. In the example of Table 1, only the blank between music numbers [4] and [5] satisfies the condition, and hence this recordable area is registered (Step P34).

When the user then conducts the key operation for recording start (Step P35), the end position E4 of music number [4] on the disk 9 is searched, and recording is started at this position (Step P36). When the recording arrives at the start position S5 of music number [5] (YES in Step P37), the record head and optical pickup jump to the start position Ua of the free record area and the recording is resumed (Step P38). After the key operation for recording stop is done and the recording is ended (Step P39), program times of a first portion recorded in the blank between music numbers [4] and [5] and a second portion recorded in the free record area, and the above-mentioned marking is written to the TOC in correspondence with music number [6] following music number [5] of the prerecorded music (Step P40). In the case that a plurality of blanks between music pieces satisfy the above-mentioned conditions, the recording is done on the blanks in sequence.

In the recording sequence shown in FIG. 12, the judgment of the recordable area is conducted before the start of the recording, using the TOC which is read out in advance of the recording. Alternatively, the judgment may be conducted after the key operation for recording start. When the disk has plural recordable areas, the order of subjecting the areas to the recording is not restricted. For example, the orders of program numbers and area lengths may be adequately determined.

In all of embodiments 3 to 5 described above, recording times may be subtracted from the recordable time displayed before the recording, and the resulting recordable time may be displayed to inform the user of it.

EMBODIMENT 6

Figure 13:
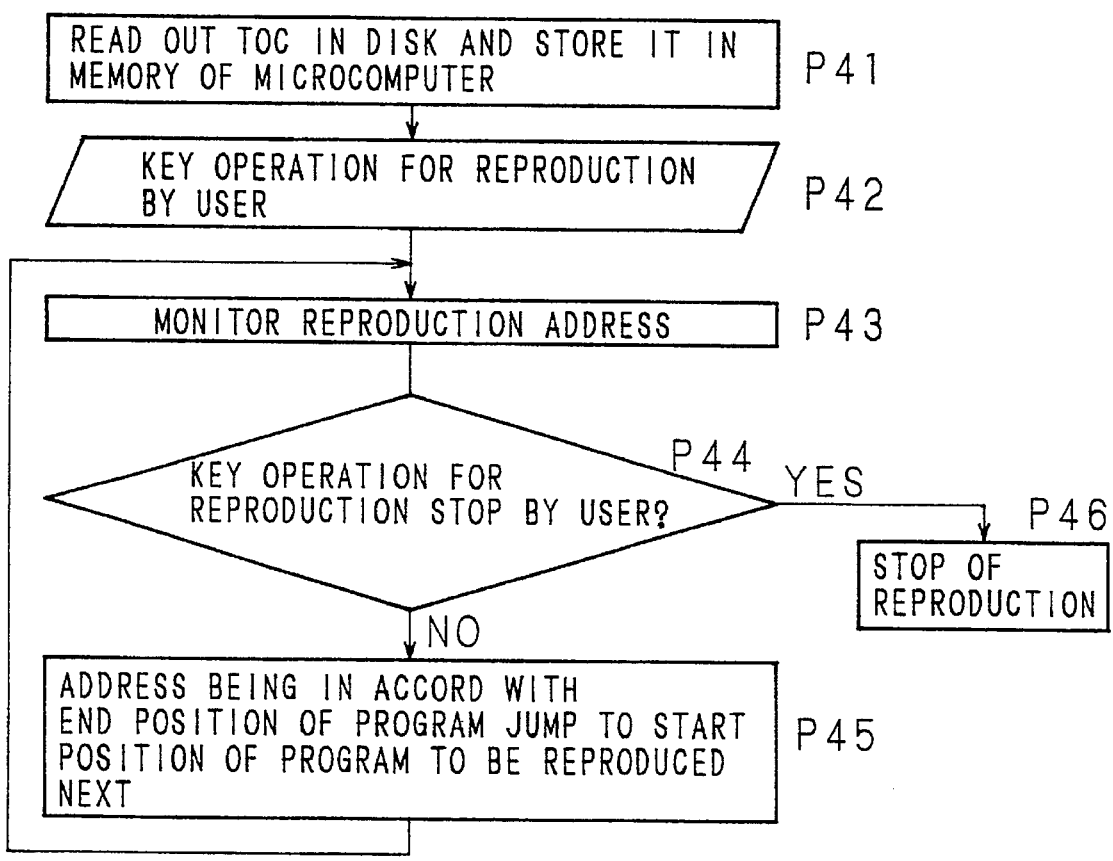
FIG. 13 is a flowchart illustrating a reproduction sequence.

Next, a reproduction sequence will be specifically described. FIG. 13 is a flowchart of the reproduction sequence. Before the reproduction of an audio signal, the TOC is previously read out (Step P41), and the user operates a reproduction key (Step P42). When the disk is under reproduction, the reproduction address is monitored (Step P43). When the user operates a reproduction stop key (YES in Step P44), the reproduction process is stopped (Step P46). When the reproduction stop key has not been operated by the user (NO in Step P44) and the current address arrives at the end position of a program, the optical pickup jumps to the start position of the next program to be reproduced (Step P45), and the reproduction is resumed. More specifically, in the case that music pieces are not continuously recorded on a disk and the end position of a music piece is separated from the start position of the next music piece by a blank, the reproduction is conducted while skipping the blank.

Alternatively, the skip operation may be selectively conducted. Namely, the optical pickup may be controlled so as to jump only when, on the basis of the TOC data which are previously read out, the microcomputer 19 judges that the blank length between adjacent music piece is greater than a predetermined value (e.g., 3 sec.).

EMBODIMENT 7

Next, a record/reproduction sequence in which the user can freely set a portion to be cut during reproduction will be described. The following description deals with a case wherein the portion extending from the middle of program D shown in Table 1 and FIG. 9 to the end of program D is to be cut in the reproduction. In a search mode or usual reproduction mode, the user looks out the start and end positions of the portion to be cut in the reproduction. While reproducing the disk, the user then operates the keys to designate the start position of the portion to be cut. On the basis of the address of the designated position, the microcomputer 19 rewrites the program time of program number [4] corresponding to program D. During the reproduction process, the reproduction of the portion between the position designated by the user and the start position of the next music is cut by conducting the reproduction process in such a manner that the skip operation described above is done. When it is modified so that the user can arbitrarily input also the start position of the program, it is possible to cut an arbitrary portion during the reproduction process.

Figure 11:
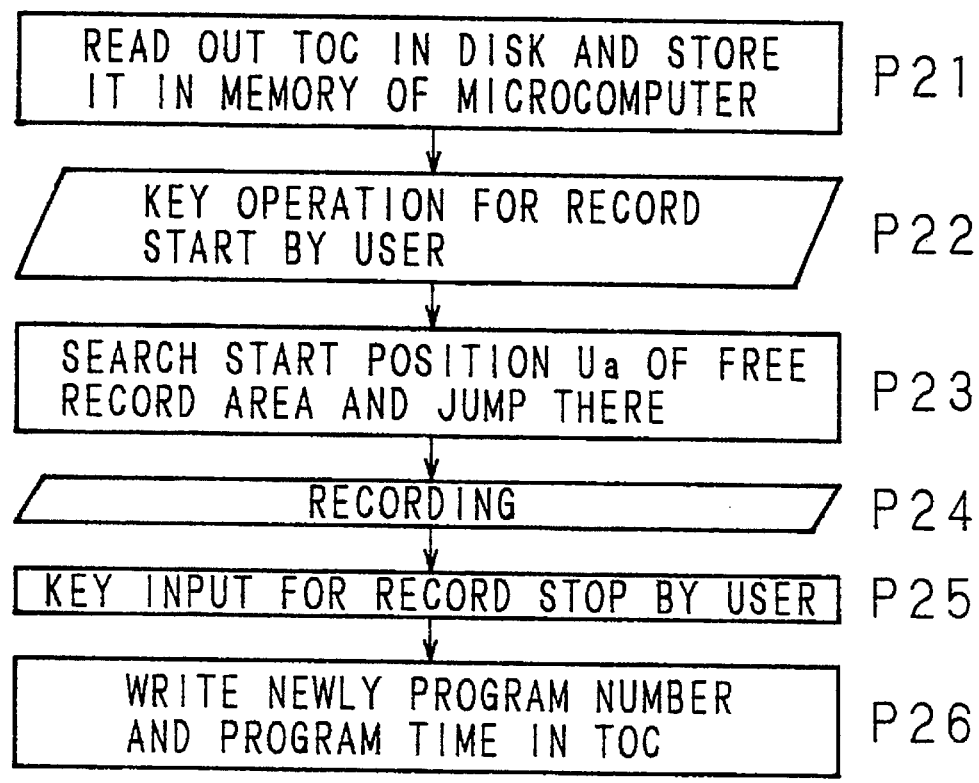
FIG. 11 is a flowchart illustrating another record sequence.

In the record sequences of embodiments 3, 4 and 5 shown in FIGS. 10, 11 and 12, the operation of jumping the record head and optical pickup to the record start position may be conducted before or after the operation of the record start key.

In embodiments 3 to 7 described above, a program start position and a program time are written to the TOC in correspondence with a program number. The data to be written to the TOC are not limited to these. For example, a program start position and a program end position may be written to the TOC. This alternative can achieve the same effects as the embodiments. Although the embodiments which are apparatuses for recording and reproducing encoded audio signals have been described, the invention can be applied to an apparatus for recording and reproducing signals of another type such as image signals, and digital data from a computer, and also to an apparatus in which the recording and reproduction are conducted by a method other than the magnetooptical method. It is a matter of course that the values such as addresses used in the description are exemplified ones and the invention is not limited to them.

As described above, in the record/reproduction apparatuses of embodiments 3 to 7, subcode data such as the start position and program time of each program are recorded to and reproduced from the TOC, an unused free record area is judged on the basis of the subcode data, and during the record process the free record area or recordable area is automatically searched and the recording is conducted thereon. The apparatuses have a record mode where, in the case that new data are to be recorded on a recorded disk, the program number of a specific program is designated, and a new program is recorded in place of the designated program, and, after the recording is ended, subcode data are automatically written to the TOC in correspondence with the program number. In the reproduction process, the TOC is firstly read out, addresses in reproduced signals are always monitored, and the optical pickup jumps from the end position of a program to the start position of the next program to be reproduced to continue the reproduction. The jump operation is conducted only when a blank between adjacent musics is longer than a predetermined value. When adjacent musics are separated by a long blank, therefore, the recording can be conducted using the blank, thereby improving the recording efficiency.

Accordingly, the apparatuses of the embodiments can cope with various record modes including those wherein the user can replace a recorded music piece with a new music piece or record a new music piece without erasing a recorded music. Furthermore, a record/reproduction apparatus can be provided in which, even when a disk wherein long blanks between pieces and short blanks are mixedly formed is to be reproduced, the reproduction can be conducted while keeping the times between adjacent music pieces substantially equal to each other, thereby allowing the reproduction to be natural for the user.

EMBODIMENT 8

Figure 14:
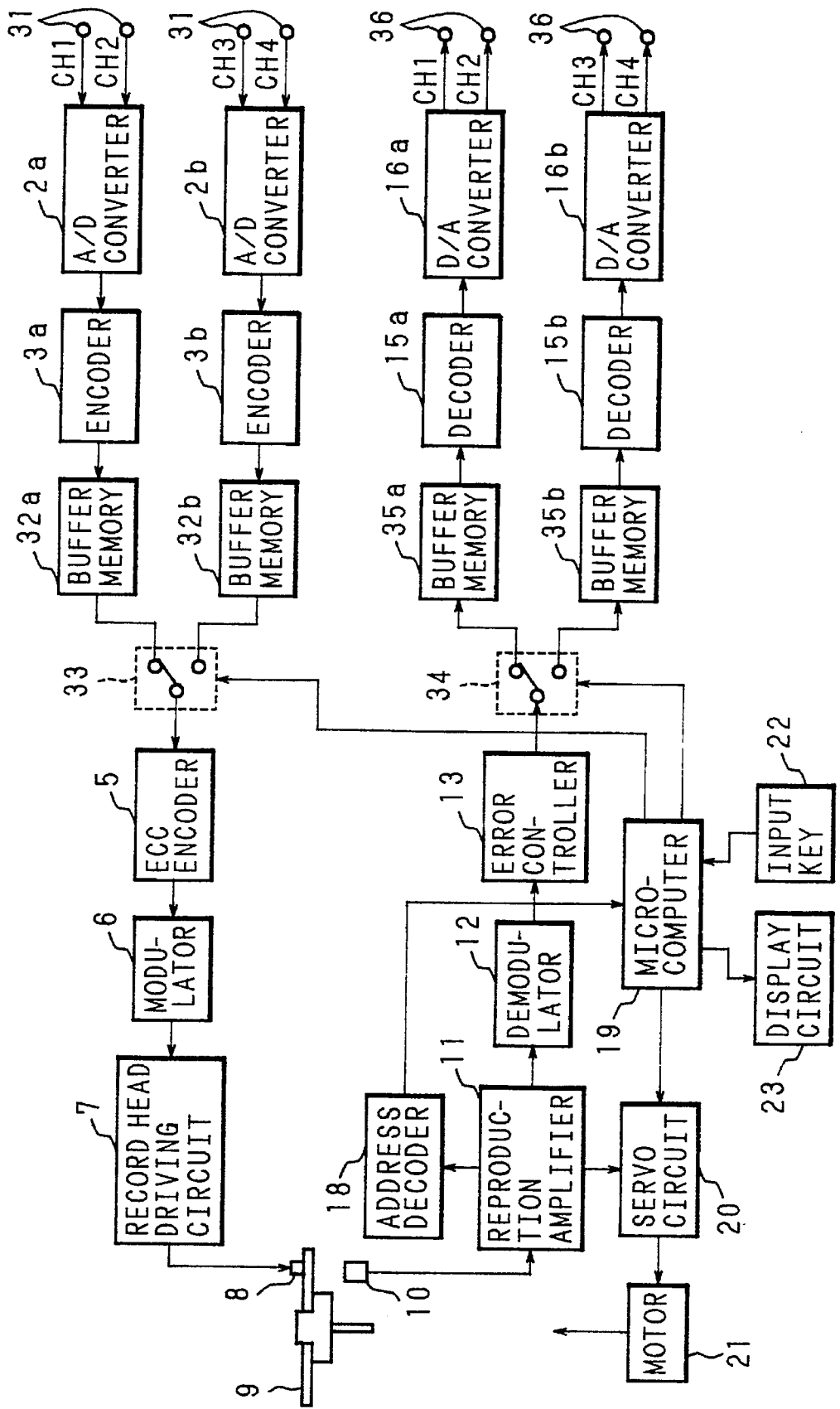
FIG. 14 is a block diagram of a further record/reproduction apparatus according to the invention.

FIG. 14 is a block diagram of an embodiment in which the invention is applied to a record/reproduction apparatus for a 4-channel audio signal. In FIG. 14, portions designated by the same reference numerals are identical or correspondent to those of FIG. 4, and therefore their description is omitted. In the figure, 31 designates 4-channel audio signal input terminals, 32a and 32b designate buffer memories for recording, 33 designates a switch for selecting record signals, 34 designates a switch for selecting reproduction signals, 35a and 35b designate buffer memories for reproduction, and 36 designates 4-channel audio signal output terminals.

Figure 15:
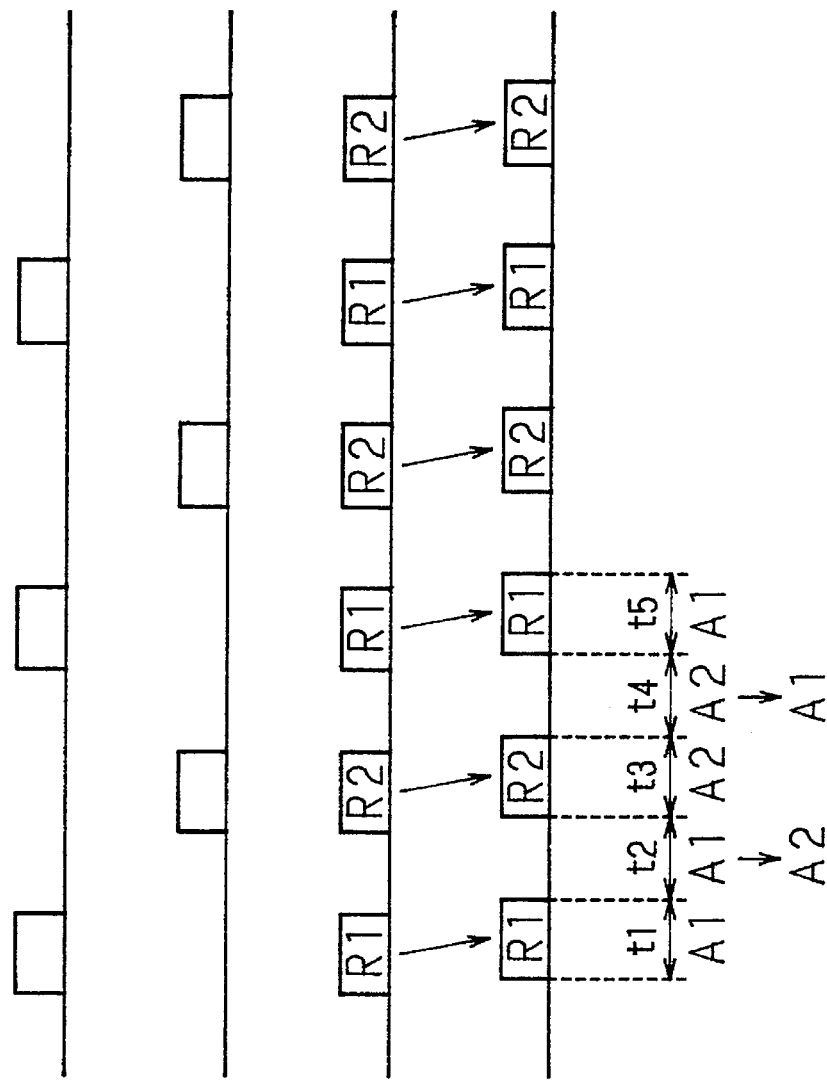
FIG. 15(a) is a timing chart illustrating the record process of the apparatus of FIG. 14.
FIG. 15(b) is a timing chart illustrating the record process of the apparatus of FIG. 14.
FIG. 15(c) is a timing chart illustrating the record process of the apparatus of FIG. 14.
FIG. 15(d) is a timing chart illustrating the record process of the apparatus of FIG. 14.

FIG. 15 shows timing charts illustrating the record signal processing and operation of the apparatus of FIG. 14. Initially, with reference to FIGS. 14 and 15, the operation of recording 4-channel audio signals will be described. Two 2-channel sets of 4-channel analog audio signals supplied through the audio signal input terminals 31 are respectively sampled in the A/D converters 2a and 2b, to be converted into digital signals. The digital signals are subjected to an audio compression encoding process in the encoders 3a and 3b, respectively. The two sets of the 2-channel encoded signals are once stored in the buffer memories 32a and 32b.

As shown in FIGS. 15(a) and 15(b), the signals are intermittently read out from the two buffer memories 32a and 32b in such a manner that, during a period of reading out signals from one of the memories, the readout of signals from the other memory is inhibited. The switch 33 alternately selects either of the contacts in correspondence with the periods during which signals are read out from the two buffer memories 32a and 32b, so that two encoded signals are alternately output from the switch 33. These signals are shown in FIG. 15(c) as those respectively labeled R1 and R2. In the encoder 5 and the modulator 6, the signals are subjected to the interleave process, a process of generating error-correcting codes and adding them to signals, and the EMF modulation, and then supplied to the magnetic record head 8 through the record head driving circuit 7.

Figure 16:
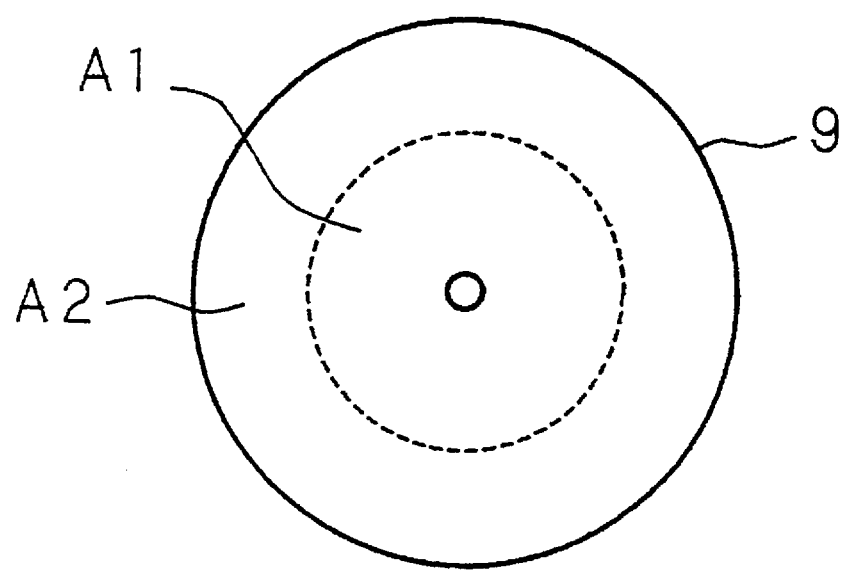
FIG. 16 is a diagram showing recording areas on a disk used in the apparatus of FIG. 14.

The 2-channel signals R1 and R2 are recorded in different areas of the single disk 9, respectively. FIG. 16 is a diagram showing areas on the disk 9 in which the signals are to be recorded. The area A1 in which the signal R1 is to be recorded is formed in the inner portion of the disk, and the area A2 in which the signal R2 is to be recorded is formed the outer portion of the disk. The manner of arranging the areas A1 and A2 can be arbitrarily selected. As far as the positions of the areas on the disk 9 are predetermined, it is possible to manage the areas in the term of addresses.

Depending on the kind of signal to be recorded, i.e., the signal R1 or the signal R2, the magnetic record head 8 and optical pickup 10 for conducting the recording are controlled so as to be positioned in either of the areas A1 and A2. More specifically, in the period t1 during which the signal R1 is supplied to the magnetic record head 8, the magnetic record head 8 and the optical pickup 10 are positioned in the area A1 and conduct the recording therein, and the microcomputer 19 stores the end address position of the recording of the signal R1. After the recording of the signal R1 is ended, the generation of the recording current is stopped, and the magnetic record head 8 and the optical pickup 10 are moved to the area A2 during the period t2 and wait therein. In the period t3 during which the signal R2 is supplied to the magnetic record head 8, the recording current is generated to conduct the recording, and the microcomputer 19 stores the end address position of the recording of the signal R2. After the recording of the signal R2 is ended, the generation of the recording current is stopped, and the magnetic record head 8 and the optical pickup 10 are moved again to the area A1 during the period t4, search the previously stored end address position of the recording of the signal R1, and wait at the position.

In the next period t5 of supplying the signal R1, the recording is conducted in the portion subsequent to the previous recorded portion, and the end address position of the recording is updated. In this way, the magnetic record head 8 and the optical pickup 10 are moved in correspondence with the signals R1 and R2, and the signals are continuously recorded in the respective areas using the address signal. In this process, a disk rotation servo control and a tracking servo control are done so that the recording is correctly conducted in each area.

Figure 17:
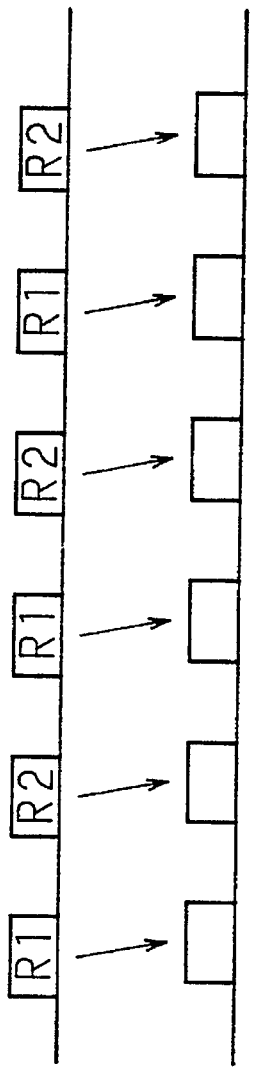
FIG. 17(a) is a timing chart illustrating the reproduction process of the apparatus of FIG. 14.
FIG. 17(b) is a timing chart illustrating the reproduction process of the apparatus of FIG. 14.
FIG. 17(c) is a timing chart illustrating the reproduction process of the apparatus of FIG. 14.
FIG. 17(d) is a timing chart illustrating the reproduction process of the apparatus of FIG. 14.
FIG. 17(e) is a timing chart illustrating the reproduction process of the apparatus dr FIG. 14.

Next, the reproduction operation will be described. FIG. 17 shows timing charts illustrating the reproduction signal processing and operation of the apparatus of FIG. 14. In a similar manner as the recording process, in the reproduction process, the optical pickup 10 for reading signals on the disk is moved to reproduce the signals in the two record areas. More specifically, during the period t1, the optical pickup 10 is positioned in the area A1 to read the signal R1, and the microcomputer 19 stores the end address position of the reproduction. Then, the optical pickup 10 is moved to the area t2 during the period A2, and reads out the signal R2 during the period t3, and the microcomputer 19 stores the end address position of the reproduction of the signal R2. The optical pickup 10 is moved again to the area A1 during the period t4, searches the previously stored end address position of the reproducing the signal R1, and reads out the signal R1 during the period t5. The above processes are repeated.

The signals read out by the optical pickup 10 are amplified by the reproduction amplifier 11, and then subjected in the demodulator 12 and the error controller 13 to the demodulation, the error detection and error correction processes and the deinterleave process. The processed signals are separately supplied by the switch 34 to the buffer memories 35a and 35b respectively corresponding to the signals R1 and R2. The signals read out from the buffer memories 35a and 35b are sent to the data decoders 15a and 15b which in turn restore them to 2-channel continuous signals. The signals are then converted into analog signals by the D/A converters 16a and 16b, and output through the audio signal output terminals 36.

As described above, embodiment 8 can record and reproduce 4-channel audio signals. By shortening the search time, the apparatus may be modified so as to record and reproduce audio signals for a system of 5 or more channels. It is a matter of course that the apparatus can record and reproduce audio signals for two 2-channel sources or a multilingual system in place of 4-channel audio signals.

EMBODIMENT 9

Figure 18:
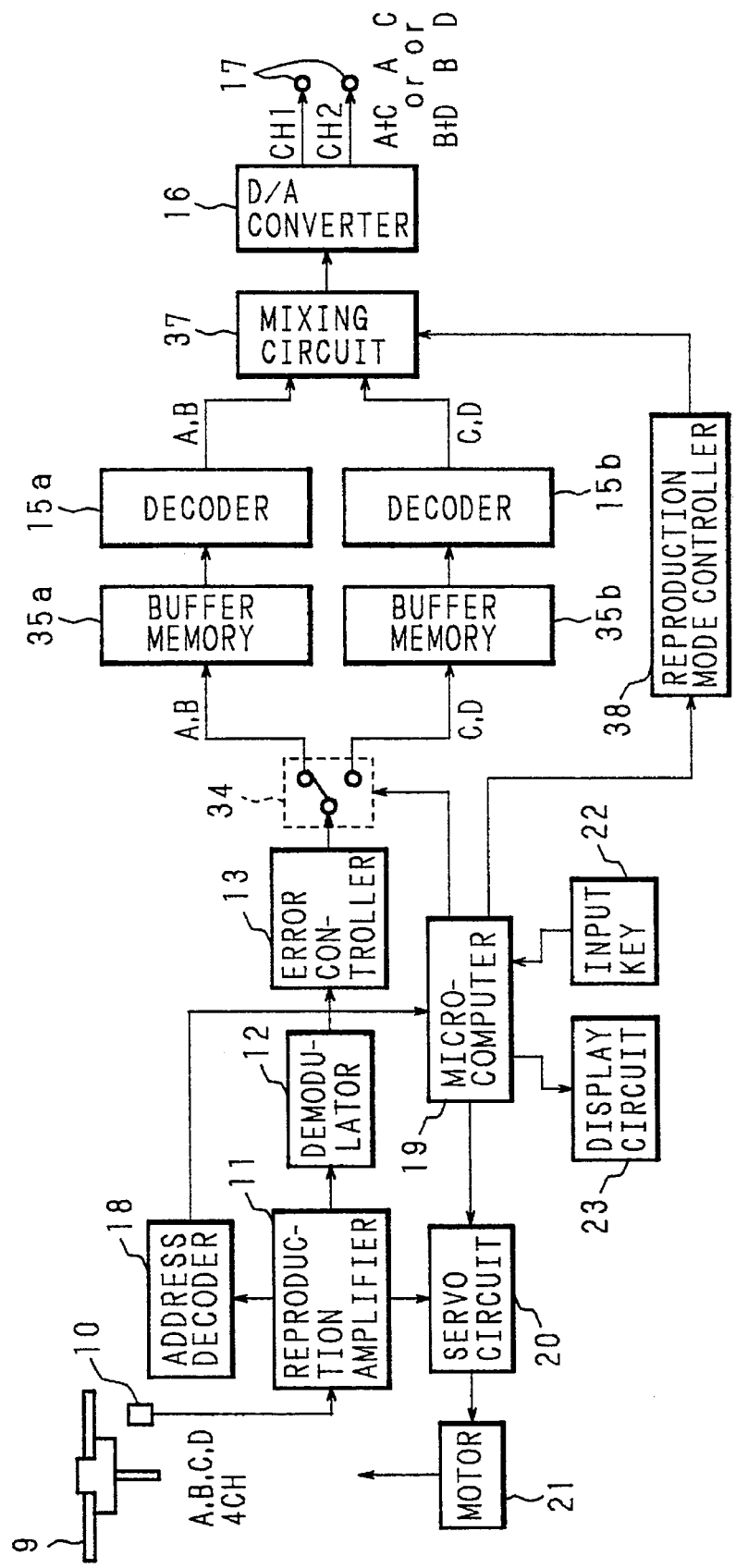
FIG. 18 is a block diagram of a reproduction apparatus according to the invention.

FIG. 18 is a block diagram of a reproduction apparatus according to embodiment 9. In FIG. 18, portions designated by the same reference numerals are identical or correspondent to those of FIGS. 4 and 14, and therefore their description is omitted. In the figure, 37 designates a mixing circuit, and 38 designates a reproduction mode controller, The readout of signals from the disk 9 is conducted in the same manner as embodiment 8 so that two 2-channel signals are reproduced. The four channels of the signals recorded on the disk 9 are designated by A, B, C and D, respectively. For example, only the instrumental performance portion of a music is recorded in the channels A and B, and only the vocal portion corresponding to the instrumental performance is recorded in the channels C and D. In a first reproduction mode of the apparatus, the signals of 4 channels restored by the decoders 15a and 15b are input to the mixing circuit 37 which in turn mixes them to generate signals of two channels of A+C and B+D. The signals A+C and B+D are subjected to the D/A conversion to be reproduced as analog signals. Therefore, the apparatus can reproduce a music in which the instrumental performance portion and the vocal portion are mixed with each other.

When a second reproduction mode is selected by the reproduction mode controller 38, the mixing circuit 37 does not conduct the mixing process, and selectively outputs either of the channel combinations A and B, and C and D. When the channels A and B are selected, therefore, only the instrumental performance portion of a music can be reproduced so as to be used in a song with recorded instrumental accompaniment or the like.

In the embodiment of FIG. 18, signals which have not yet been subjected to the D/A conversion (i.e., digital signals) are mixed with each other. Alternatively, the mixing may be conducted on signals which have been returned to the analog form.

EMBODIMENT 10

Figure 19:
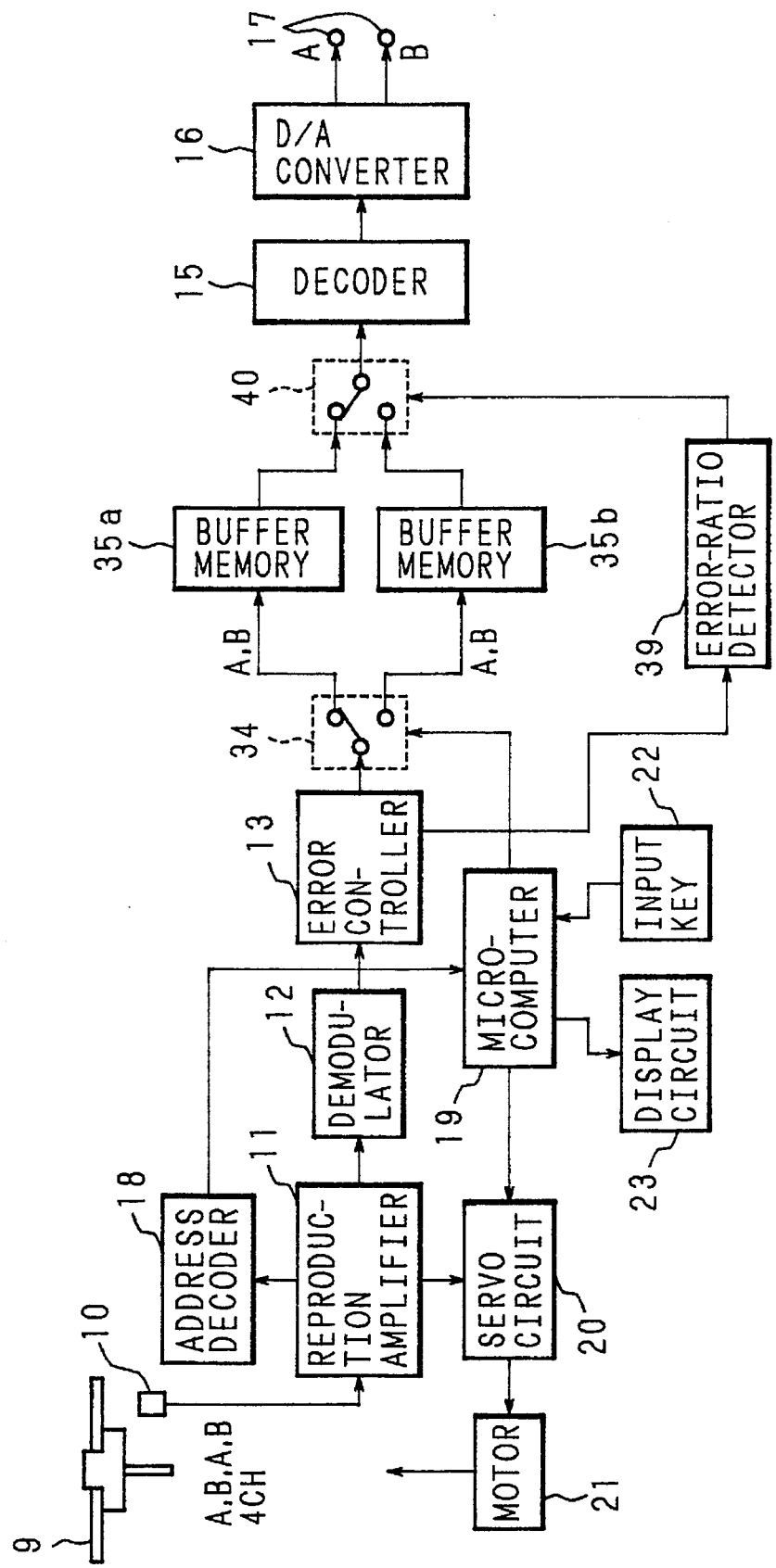
FIG. 19 is a block diagram of another reproduction apparatus according to the invention.

FIG. 19 is a block diagram of a reproduction apparatus according to embodiment 10. In this embodiment, the functions described above are utilized for improving the reliability of the apparatus. In FIG. 19, portions designated by the same reference numerals are identical or correspondent to those of FIGS. 4 and 14, and therefore their description is omitted. In the figure, 39 designates an error-ratio detector, and 40 designates a signal selection switch. In the record process, the same signal is recorded in duplicate or both in the areas A1 and A2 on the disk 9. In the reproduction process, the error-ratio detector 39 judges the reliabilities of the reproduced signals R1 and R2 of FIG. 17(c). The signal selection switch 40 selects the one of the signals R1 and R2 which has the higher reliability, and supplies the selected signal to the decoder 15. Accordingly, the apparatus can conduct the reproduction with a higher reliability.

EMBODIMENT 11

In the record/reproduction apparatus of embodiment 8 of FIG. 14, data are recorded to or reproduced from the areas A1 and A2 in a time sharing manner. Alternatively, the process of reproducing data from the area A1 and the process of recording data to the area A2 may be conducted in a time sharing manner. With the object of learning a language, for example, the voice of a teacher is previously recorded in the area A1, and the voice of a student is recorded in the area A2 while reproducing the teacher's voice. In this case, the contacts of the switches 33 and 34 shown in the block diagram of FIG. 14 are connected to their upper contacts. FIG. 20 shows timing charts of this case. The basic process of the embodiment is the same as that of embodiment 8 except that the reproduction and record processes are conducted so that the record signal of FIG. 20(f) is output during the periods in which the reproduction signal shown in FIG. 20(a) is not output.

In a modification of the record/reproduction apparatus of embodiment 11, for example, a mixing circuit for mixing a signal reproduced from the disk 9 with a signal input from the outside may be provided, and the mixed signal may be recorded in another area of the disk.

In another modification, a signal reproduced from the disk 9 may be subjected to the equalizing process and then recorded in another area of the disk.

Although embodiments 8 to 11 which are apparatuses for recording and reproducing encoded audio signals have been described, the invention can be applied to an apparatus for recording and reproducing signals of another type such as image signals, and digital data.

As described above, in embodiments 8 to 11, during a period in which a first data signal (a 2-channel audio signal) is not recorded or reproduced, the magnetic record head 8 is moved to a second area on the disk 9 and a second data signal (another 2-channel audio signal) is recorded to or reproduced from the second area, the magnetic record head 8 is moved again to the original area, and the first data signal is recorded to or reproduced from a portion continuous to a portion in which the record or reproduction has been conducted. Therefore, the apparatus can cope with signals of four or more channels. Two sets of data of the same contents can be recorded as the first and second data signals, so that the one of the two data sets which has a higher reliability is selectively output, whereby the reliability of the signal is increased. While reproducing the first data signal and confirming the contents of the signal, the second data signal can be recorded to another area of the disk. Therefore, the invention can provide a record/reproduction apparatus which has novel functions and in which a special record/reproduction process such as the mixing record can be realized on a single disk.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A recording/reproducing apparatus for recording data signals having a compressed data amount and recording signals having continuous addresses on a recording medium, and reproducing the data signals, comprising:

data signal input means for encoding and compressing a continuous input signal, output as a first data signal;

recording means for recording the first data signal on the recording medium;

reproduction means for reproducing a second data signal from the recording medium;

recording/reproduction control means for recording a first portion of the first data signal in a first area of the recording medium, for reproducing a first portion of the second data signal from a second area, for recording a second portion of the first data signal, following an end address of the first portion of the first data signal, into the first area of the recording medium, and for reproducing a second portion of the second data signal from the second data area, thereby alternately recording the first data signal and reproducing the second data signal; and data signal output means for expanding and decoding at least the first and second portions of the second data signal to produce a continuous output signal.

2. The recording/reproducing apparatus of claim 1, wherein the first data signal includes a first channel and a second channel, wherein said recording means intermittently records the first channel and the second channel, such that the second channel is recorded when the recording of the first channel is not conducted, to thereby continuously record the first data signal on the recording medium; and the second data signal includes a third channel and a fourth channel, wherein said reproducing means intermittently reproduces the third channel and the fourth channel, such that the fourth channel is reproduced when reproduction of the third channel is not conducted, to thereby continuously reproduce the second data signal from the recording medium.

3. The recording and reproducing apparatus according to claim 1, wherein said data signal output means outputs said continuous output signal simultaneously with receipt of said continuous input signal by said data signal input means.

4. A recording/reproduction apparatus for recording data signals having a compressed data amount and for recording signals having continuous addresses on a recording medium and reproducing the data signals, comprising:

data signal input means for encoding and compressing a first group of channels of a multi-channel data signal, output as a first data signal, said first group of channels being represented by a continuous input signal;

recording means for recording the first data signal on the recording medium;

reproducing means for reproducing a second data signal from the recording medium;

recording/reproduction control means for recording a first portion of the first data signal into a first area of the recording medium, for reproducing a first portion of the second data signal from a second area of the recording medium, for recording a second portion of the first data signal, following an end address of said first portion of the first data signal, into the first area of the recording medium, and for reproducing a second portion of the second data signal from the second data area, thereby alternately recording the first data signal and reproducing the second data signal; and data signal output means for expanding and decoding at least the first and second portions of the second data signal to produce a continuous output signal representing a second group of channels of the multi-channel data signal.

5. The recording/reproducing apparatus of claim 4, wherein the multi-channel data signal is a four channel signal and the first group of channels includes two channels and the second group of channels includes two channels.

6. The recording/reproducing apparatus of claim 5, wherein the four channel signal is a four channel audio signal.

7. The recording/reproducing apparatus of claim 5, wherein said recording means intermittently records a first channel of the first group of channels, and a second channel of the first group of channels such that the second channel of the first group of channels is recorded when recording of the first channel of the first group of channels is not conducted, to thereby continuously record the first data signal on the recording medium; and said reproducing means intermittently reproduces a first channel of the second group of channels and a second channel of the second group of channels, such that the second channel of the second group of channels is reproduced when reproduction of the first channel of the second group of channels is not conducted, to thereby continuously reproduce the second data signal from the recording medium.

8. The recording and reproducing apparatus according to claim 4, wherein said data signal output means outputs said continuous output signal simultaneously with receipt of said continuous input signal by said data signal input means.

* * * * *